(12) United States Patent
Rarick et al.

(10) Patent No.: US 7,295,672 B2
(45) Date of Patent: Nov. 13, 2007

(54) METHOD AND APPARATUS FOR FAST RC4-LIKE ENCRYPTION

(75) Inventors: Leonard D. Rarick, San Diego, CA (US); Christopher H. Olson, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 781 days.

(21) Appl. No.: 10/617,632

(22) Filed: Jul. 11, 2003

(65) Prior Publication Data

US 2005/0010527 A1 Jan. 13, 2005

(51) Int. Cl.
*H04L 9/00* (2006.01)
(52) U.S. Cl. .............................. 380/42; 380/28; 380/37; 380/43
(58) Field of Classification Search ...................... None
See application file for complete search history.

(56) References Cited

U.S. PATENT DOCUMENTS

| | | | |
|---|---|---|---|
| 5,485,619 A * | 1/1996 | Lai et al. ..................... | 717/150 |
| 6,389,535 B1 | 5/2002 | Thomlinson et al. | |
| 6,549,622 B1 * | 4/2003 | Matthews, Jr. ............... | 380/29 |
| 6,618,806 B1 | 9/2003 | Brown et al. | |
| 6,683,954 B1 | 1/2004 | Searle | |
| 6,980,649 B1 * | 12/2005 | Batcher ....................... | 380/42 |
| 7,043,017 B2 * | 5/2006 | Swindlehurst et al. ........ | 380/29 |
| 2003/0044007 A1 * | 3/2003 | Matthews, Jr. ............... | 380/44 |

FOREIGN PATENT DOCUMENTS

EP 1289188 3/2003

OTHER PUBLICATIONS

Hamalainen et al., Hardware Implementation of the Improved WEP And RC4 Encryption Algorithms for Wireless Terminals, European Signal Processing Conference, Sep. 2000, Retrieved from the Internet on Feb. 12, 2007: <URL: http://www.eurasip.org/content/Eusipco/2000/sessions/FriPm/SS3/cr1539.pdf>.*

(Continued)

*Primary Examiner*—Gilberto Barron
*Assistant Examiner*—Minh Dinh
(74) *Attorney, Agent, or Firm*—Meyertons Hood Kivlin Kowert & Goetzel, P.C.; Erik A. Heter

(57) ABSTRACT

A method and apparatus for encrypting information. In one embodiment, a method for encrypting information includes obtaining a value A from an array having a plurality of values and determining a value B based on the value A in a first pipeline stage. In a second pipeline stage, a value V may be determined from the value A and the value B. The value V may then be exclusive ORed (XORed) with a data value that forms a portion of the information being encrypted. A first logic unit may include the first pipeline stage, while a second logic unit may include the second pipeline stage. The array may be stored in a plurality of flip-flops in one embodiment, or may be stored in one or more register files in a second embodiment. The method and apparatus may be used for decrypting information as well.

38 Claims, 12 Drawing Sheets

OTHER PUBLICATIONS

Mano, Computer System Architecture, 1993, Prentice Hall, 3rd Edition, pp. 302-307.*

Mano et al., "Logic and Computer Design Fundamentals", 2000, 2nd Edition, pp. 450-455.*

Schneier, "applied cryptography, Passage", *Applied Cryptography, Protocols, Algorithms, and Source Code in C*, New York, John Wiley & Sons, US, 1996, pp. 397-398, XO002298218, ISBN: 0-471-11709-9, p. 397 para. 17.1—p. 398.

Schneier, "Fast Software ENcryption: Designing Encryption Algorithms for Optimal Software Speed on the Intel Pentium Processor", *Fast Software Encryption, International Workshop*, Jan. 20, 1997, pp. 242-259, XP008002230, p. 246, paragraph 3.1—p. 248.

International search report application No. PCT/US2004/022248 mailed Oct. 11, 2004.

* cited by examiner

RC4 Key State Box

METHOD AND APPARATUS FOR FAST RC4-LIKE ENCRYPTION

BACKGROUND OF THE INVENTION

1. Field of the Invention

This invention relates to encryption, and more particularly to methods of fast RC4™-like encryption.

2. Description of the Related Art

Many modern data processing systems require the use of encryption algorithms to ensure secure transfer of data. One such encryption algorithm is known as the RC4™ encryption algorithm. The RC4™ encryption algorithm is a very widely used method of encryption, due to both its small size and fast speed. Algorithms similar to RC4™ have also been implemented. RC4™ and similar encryption algorithms are known as stream ciphers. Each iteration of the encryption process produces a number of bits that is exclusive-OR'ed (XOR'ed) with a number of plaintext bits in order to produce the cipher text data. In the case of the RC4™ encryption algorithm, the number of bits produced each iteration is 8 (i.e. one byte). Decryption of a cipher data to a plaintext data may be similar to encryption.

Encryption using algorithms such as RC4™ involves a permutation array having 256 elements for 8-bit encryption (embodiments of similar algorithms that encrypt a different number of bits and thus have different array sizes are also possible). This array may also be referred to as the 'S' array. Thus, for 8-bit encryption, the array size is 256 elements ($2^8=256$). The array may store a permutation of the values between 0 and 255, with each location holding one of the values. For this embodiment, all additions are performed in mod 256. That is, if a result of any sum is greater than 255, the value of 256 is subtracted from the sum enough times so that the result is less than 256 but not negative. Two byte indices, 'i' and 'j' are also maintained for indexing elements in the array. The array may be initialized with a 256-byte key, K, using the following procedure:

---
Procedure 1

1.1: for i = 0 to 255, S[i] = i
1.2: j = 0
1.3: for i = 0 to 255 do the following:
    1.3.1: A = S[i]
    1.3.2: j = j + A + K[i]
    1.3.3: B = S[j]
    1.3.4: S[i] = B
    1.3.5: S[j] = A
1.4: i = 0
1.5: j = 0

---

Procedure 1 initializes the S array for array permutation and then initializes both i and j to zero. The initialized array may then be used for encryption operations. Table 1 below illustrates an example of array initializing based on the key sequence (i.e. values of K[i]) 1, 2, 4, 2, 7, 6, 3, 5. It should be noted that for the initialization procedure, the value of K[i] is a value that is input into the procedure, not a value that must be obtained from the S array. For the sake of simplicity, the table shown here is limited to 8 3-bit "bytes" instead of 256.

TABLE 1

| key | S | | | | | | | | i | A | j | B | S swap | | | | | | | |
|---|---|---|---|---|---|---|---|---|---|---|---|---|---|---|---|---|---|---|---|---|
| | 0 | 1 | 2 | 3 | 4 | 5 | 6 | 7 | | | | | 0 | 1 | 2 | 3 | 4 | 5 | 6 | 7 |
| | | | initialize | | | | | | | 0 | | | 0 | 1 | 2 | 3 | 4 | 5 | 6 | 7 |
| 1 | 0 | 1 | 2 | 3 | 4 | 5 | 6 | 7 | 0 | 0 | 1 | 1 | 1 | 0 | 2 | 3 | 4 | 5 | 6 | 7 |
| 2 | 1 | 0 | 2 | 3 | 4 | 5 | 6 | 7 | 1 | 0 | 3 | 3 | 1 | 3 | 2 | 0 | 4 | 5 | 6 | 7 |
| 4 | 1 | 3 | 2 | 0 | 4 | 5 | 6 | 7 | 2 | 2 | 1 | 3 | 1 | 2 | 3 | 0 | 4 | 5 | 6 | 7 |
| 2 | 1 | 2 | 3 | 0 | 4 | 5 | 6 | 7 | 3 | 0 | 3 | 0 | 1 | 2 | 3 | 0 | 4 | 5 | 6 | 7 |
| 7 | 1 | 2 | 3 | 0 | 4 | 5 | 6 | 7 | 4 | 4 | 6 | 6 | 1 | 2 | 3 | 0 | 6 | 5 | 4 | 7 |
| 6 | 1 | 2 | 3 | 0 | 6 | 5 | 4 | 7 | 5 | 5 | 1 | 2 | 1 | 5 | 3 | 0 | 6 | 2 | 4 | 7 |
| 3 | 1 | 5 | 3 | 0 | 6 | 2 | 4 | 7 | 6 | 4 | 0 | 1 | 4 | 5 | 3 | 0 | 6 | 2 | 1 | 7 |
| 5 | 4 | 5 | 3 | 0 | 6 | 2 | 1 | 7 | 7 | 7 | 4 | 6 | 4 | 5 | 3 | 0 | 7 | 2 | 1 | 6 |
| | | | end initialize | | | | | | | 0 | | 0 | 4 | 5 | 3 | 0 | 7 | 2 | 1 | 6 |

As can be seen from examining the progress of the array initialization, the index 'i' progresses sequentially through each value, while the index 'j' is dependent on previous values of itself, A (which is S[i]) and K[i] and thus does not progress through any set sequence. In fact, all subsequent values produced in the loop of 1.3 are dependent upon the value of A, and thus retrieving A from the array becomes a critical step in the process of initialization (this is also true of the encryption process, as will be shown below). The final line (labeled 'end initialize') is the initialized array that can be used to begin encryption operations.

Once the array has been initialized, encryption can be performed using an encryption procedure, shown below as Procedure 2.

---
Procedure 2

2.1: i = i + 1
2.2: A = S[i]
2.3: j = j + A
2.4: B = S[j]
2.5: S[i] = B
2.6: S[j] = A
2.7: g = A + B
2.8: V = S[g]
2.9: result = V XOR (the next byte to be encrypted)

---

Table 2 below illustrates the progression of Procedure 2 in for steps 2.1 through 2.8 in generating a value V that may be XORed with the data to be encrypted. As with Table 1, the example of Table 2 is limited to eight 3-bit "bytes" for the purposes of clarity, instead of 256 8-bit bytes, and the additions are performed in mod 8. It is noted that since all additions are module additions, after i has obtained its maximum value, the next value of i is zero.

TABLE 2

| | | | S | | | | | | | | | | | | S swap | | | | | |
|---|---|---|---|---|---|---|---|---|---|---|---|---|---|---|---|---|---|---|---|---|
| 0 | 1 | 2 | 3 | 4 | 5 | 6 | 7 | i | A | j | B | 0 | 1 | 2 | 3 | 4 | 5 | 6 | 7 | g | V |
| | | end initialize | | | | | | 0 | | 0 | | 4 | 5 | 3 | 0 | 7 | 2 | 1 | 6 | | |
| 4 | 5 | 3 | 0 | 7 | 2 | 1 | 6 | 1 | 5 | 5 | 2 | 4 | 2 | 3 | 0 | 7 | 5 | 1 | 6 | 7 | 6 |
| 4 | 2 | 3 | 0 | 7 | 5 | 1 | 6 | 2 | 3 | 0 | 4 | 3 | 2 | 4 | 0 | 7 | 5 | 1 | 6 | 7 | 6 |
| 3 | 2 | 4 | 0 | 7 | 5 | 1 | 6 | 3 | 0 | 0 | 3 | 0 | 2 | 4 | 3 | 7 | 5 | 1 | 6 | 3 | 3 |
| 0 | 2 | 4 | 3 | 7 | 5 | 1 | 6 | 4 | 7 | 7 | 6 | 0 | 2 | 4 | 3 | 6 | 5 | 1 | 7 | 5 | 5 |
| 0 | 2 | 4 | 3 | 6 | 5 | 1 | 7 | 5 | 5 | 4 | 6 | 0 | 2 | 4 | 3 | 5 | 6 | 1 | 7 | 3 | 3 |
| 0 | 2 | 4 | 3 | 5 | 6 | 1 | 7 | 6 | 1 | 5 | 6 | 0 | 2 | 4 | 3 | 5 | 1 | 6 | 7 | 7 | 7 |
| 0 | 2 | 4 | 3 | 5 | 1 | 6 | 7 | 7 | 7 | 4 | 5 | 0 | 2 | 4 | 3 | 7 | 1 | 6 | 5 | 4 | 7 |
| 0 | 2 | 4 | 3 | 7 | 1 | 6 | 5 | 0 | 0 | 4 | 7 | 7 | 2 | 4 | 3 | 0 | 1 | 6 | 5 | 7 | 5 |
| 7 | 2 | 4 | 3 | 0 | 1 | 6 | 5 | 1 | 2 | 6 | 6 | 7 | 6 | 4 | 3 | 0 | 1 | 2 | 5 | 0 | 7 |
| 7 | 6 | 4 | 3 | 0 | 1 | 2 | 5 | 2 | 4 | 2 | 4 | 7 | 6 | 4 | 3 | 0 | 1 | 2 | 5 | 0 | 7 |
| 7 | 6 | 4 | 3 | 0 | 1 | 2 | 5 | 3 | 3 | 5 | 1 | 7 | 6 | 4 | 1 | 0 | 3 | 2 | 5 | 4 | 0 |
| 7 | 6 | 4 | 1 | 0 | 3 | 2 | 5 | 4 | 0 | 5 | 3 | 7 | 6 | 4 | 1 | 3 | 0 | 2 | 5 | 3 | 1 |
| 7 | 6 | 4 | 1 | 3 | 0 | 2 | 5 | 5 | 0 | 5 | 0 | 7 | 6 | 4 | 1 | 3 | 0 | 2 | 5 | 0 | 7 |

Each of the values of V produced during the performing of the procedure may be XOR'ed with a byte of plaintext data in order to encrypt it.

The RC4™ and related encryption algorithms may be implemented in either hardware or software. In one hardware embodiment, each element of the permutation array may be input to a multiplexer. Several levels of multiplexers may be cascaded if necessary. The value of 'A' needed for each of the subsequent operations in the initialization or encryption (or decryption) procedures may be obtained through the cascaded multiplexers. For example, using 4-to-1 multiplexers, four levels of multiplexers may be used in order to obtain the value of 'A'. Each multiplexer may receive two bits as select inputs, with a total of 8 select inputs for the entire array (i.e. $2^8=256$) which represent the index 'i'. The multiplexers that receive elements of the array as inputs may receive the two least significant bits (1:0), while the next level of multiplexers receives the next two least significant bits (3:2) and so on. Using these multiplexers, a value of 'A' may be retrieved from the array. FIG. 1 is a block diagram illustrating a circuit using cascaded multiplexers in order to fetch a value from the array. Similar groups of cascaded multiplexers may be used for retrieving values of B and V.

Retrieving the value of A and thus the values of B and V are major factors in determining the amount of time elapsed in performing an encryption (or decryption) operation. Thus, any delays in retrieving these values can adversely impact the efficiency RC4™ and related encryption algorithms.

SUMMARY OF THE INVENTION

A method and apparatus for encrypting information is disclosed. In one embodiment, a method for encrypting information includes obtaining a value A from an array having a plurality of values and determining a value B based on the value A in a first pipeline stage. In a second pipeline stage, a value V may be determined from the value A and the value B. The value V may then be exclusive ORed (XORed) with a data value that forms a portion of the information being encrypted. A first logic unit may included the first pipeline stage, while a second logic unit may include the second pipeline stage. The method and apparatus may apply to the initialization of the array and to encryption of information. The array may be stored in a plurality of flip-flops in one embodiment, or may be stored in one or more register files in another embodiment. Embodiments using other types of storage technology are also possible and contemplated. In addition to being used for encrypting information, the method and apparatus may also be used for decrypting information. The first and/or second pipeline stages may also be divided into substages in order to implement pipelines having a greater number of stages, e.g., 3-stage pipelines, 4-stage pipelines, and so on.

BRIEF DESCRIPTION OF THE DRAWINGS

Other aspects of the invention will become apparent upon reading the following detailed description and upon reference to the accompanying drawings in which.

Figure 1:
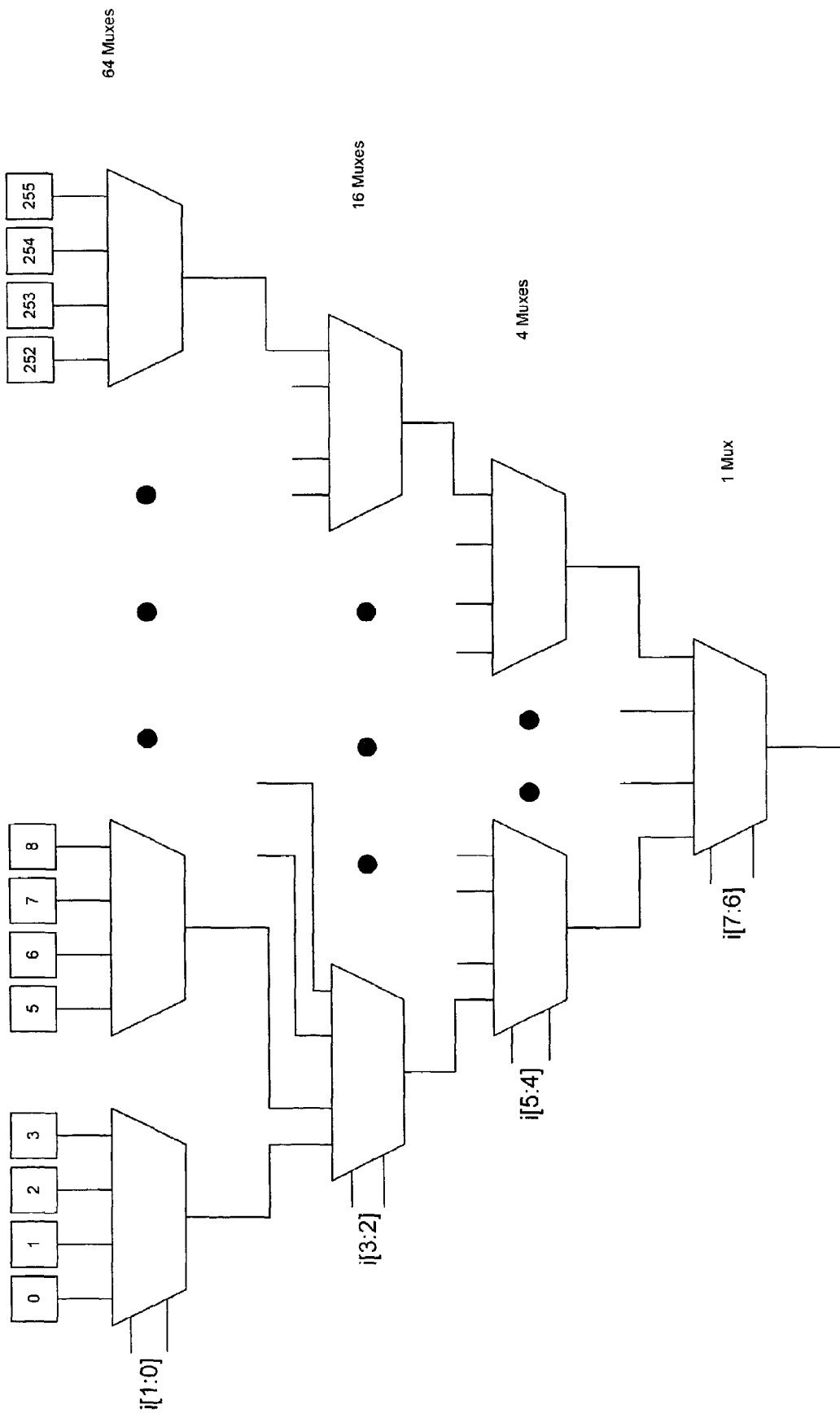
FIG. 1 (Prior Art) is a block diagram illustrating the cascading of multiplexers in order to retrieve a value from an array for one embodiment of an encryption apparatus.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Array Generation with Shifting

Figure 2:
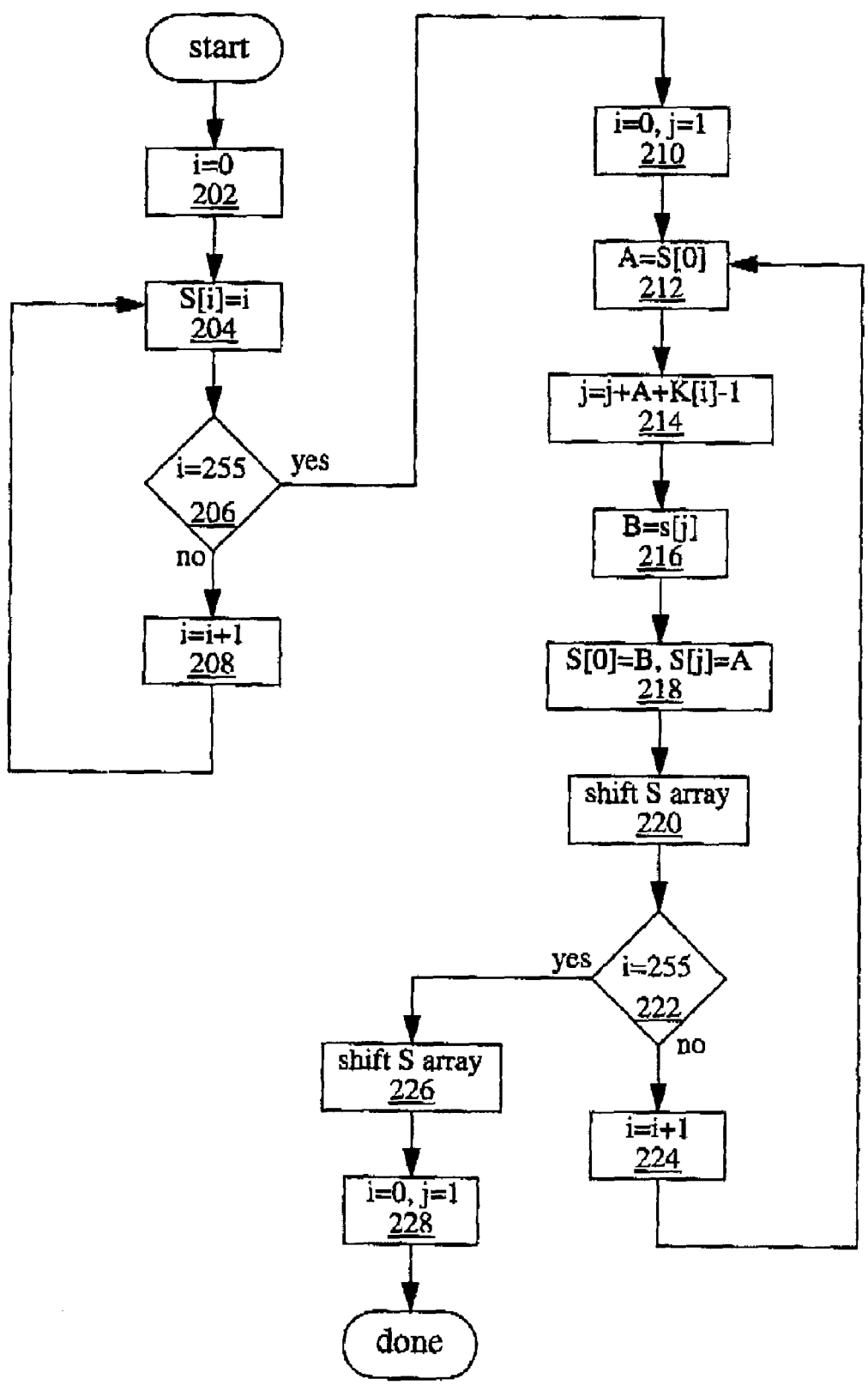
FIG. 2 is a flow diagram of one embodiment of a method of initializing an array for an encryption algorithm using array shifting.

Turning now to FIG. 2, a flow diagram of one embodiment of a method of initializing an array for an encryption algorithm using array shifting is shown. In the embodiment shown, method 200 corresponds with Procedure 3 shown below.

---
Procedure 3
---
3.1: for i = 0 to 255, S[i] = i
3.2: j = 1
3.3: for i = 0 to 255 do the following:
    3.3.1: A = S[0]
    3.3.2: j = j + A + K[i] − 1
    3.3.3: B = S[j]
    3.3.4: S[0] = B
    3.3.5: S[j] = A
    3.3.6: shift the S array (i.e., for all k, S[k] <− S[k+1])
3.4: shift the S array (i.e., for all k, S[k] <− S[k+1])
3.5: i = 0
3.6: j = 1.

---

Method 200 begins with each location in the S array being set to it's own index value (S[i]=i) as performed in the loop of items 202, 204, 206 and 208. Once the loop is completed, index values i is set to zero while index value while j is set to one (3.2 of the procedure, item 210 of the flowchart). Each of these values is used to determine the position of a value in the array that is to be read when the array is being initialized (or, as will be discussed below, when the array is being used for encryption. Following the setting of the index values, the initialization procedure enters a loop (3.3). For this particular embodiment, the array includes 256 positions, and thus the execution of the loop includes 256 iterations. Embodiments where the array is larger or smaller are possible and contemplated.

To begin the execution of the second loop, a value A is obtained from the first position in the array, S[0] (3.3, item 212). In this particular embodiment, the value A is read from the first array position for each iteration of the initialization. After reading the value A from the array, the method calculates a value of the index value j (3.3.2, item 214). In this embodiment, the value j is calculated by the equation j=j+A+K[i]−1. The value of K[i] is a key value received from a key sequence used to initialize the array. In this embodiment, since the value of A is read from S[0] for each iteration, the value of 1 is subtracted during the calculation of j.

Once the index value j is calculated, a second value B is read from the $j^{th}$ position of the array, S[j] (3.3.3, item 216). After obtaining the value B a swap operation may be performed (3.3.4, 3.3.5, item 218). The swap operation involves writing the value of B into the S[0] position of the array and the value of A into the S[j] position. Thus, in this embodiment, the value of A is obtained from the first array position for each iteration and the value B is written into the first array position for each iteration.

After the swap operation is complete, the array is shifted, with each value of S[k] being overwritten by the value of S[k+1] (3.3.6, item 220). In other words, the value present in the S[3] array position is written into the S[2] position, the value in the S[2] position is written into the S[1] position, the value in the S[1] position is written into the S[0] position, and so on. It should be noted that the value in the S[0] position is written into the last array position (S[255] in this embodiment) during the shift operation.

If the index value has not reached its upper limit (item 222), the execution of the loop continues, with the index value i being incremented (item 224). Once the method has gone through all of its iterations, execution of the loop is terminated and another array shift operation takes place (3.4, item 226). The array shift operation is identical to the one that took place during the execution of the loop. Also, the index values i and j are set to zero and one, respectively, following termination of loop execution (3.6, item 228).

Table 3 illustrates the initialization of an array using Procedure 3 described above. For the purposes of simplicity, the array shown here has been restricted to 8 elements, although the basic principles still apply.

TABLE 3

| key | S | | | | | | | | i | A | j | B | S swap | | | | | | | | S shift | | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- | --- |
| | 0 | 1 | 2 | 3 | 4 | 5 | 6 | 7 | | | | | 0 | 1 | 2 | 3 | 4 | 5 | 6 | 7 | 0 | 1 | 2 | 3 | 4 | 5 | 6 | 7 |
| | | | initialize | | | | | | | | 1 | | | | | | | | | | 0 | 1 | 2 | 3 | 4 | 5 | 6 | 7 |
| 1 | 0 | 1 | 2 | 3 | 4 | 5 | 6 | 7 | 0 | 0 | 1 | 1 | 1 | 0 | 2 | 3 | 4 | 5 | 6 | 7 | 0 | 2 | 3 | 4 | 5 | 6 | 7 | 1 |
| 2 | 0 | 2 | 3 | 4 | 5 | 6 | 7 | 1 | 1 | 0 | 2 | 3 | 3 | 2 | 0 | 4 | 5 | 6 | 7 | 1 | 2 | 0 | 4 | 5 | 6 | 7 | 1 | 3 |
| 4 | 2 | 0 | 4 | 5 | 6 | 7 | 1 | 3 | 2 | 2 | 7 | 3 | 3 | 0 | 4 | 5 | 6 | 7 | 1 | 2 | 0 | 4 | 5 | 6 | 7 | 1 | 2 | 3 |
| 2 | 0 | 4 | 5 | 6 | 7 | 1 | 2 | 3 | 3 | 0 | 0 | 0 | 0 | 4 | 5 | 6 | 7 | 1 | 2 | 3 | 4 | 5 | 6 | 7 | 1 | 2 | 3 | 0 |
| 7 | 4 | 5 | 6 | 7 | 1 | 2 | 3 | 0 | 4 | 4 | 2 | 6 | 6 | 5 | 4 | 7 | 1 | 2 | 3 | 0 | 5 | 4 | 7 | 1 | 2 | 3 | 0 | 6 |
| 6 | 5 | 4 | 7 | 1 | 2 | 3 | 0 | 6 | 5 | 5 | 4 | 2 | 2 | 4 | 7 | 1 | 5 | 3 | 0 | 6 | 4 | 7 | 1 | 5 | 3 | 0 | 6 | 2 |
| 3 | 4 | 7 | 1 | 5 | 3 | 0 | 6 | 2 | 6 | 4 | 2 | 1 | 1 | 7 | 4 | 5 | 3 | 0 | 6 | 2 | 7 | 4 | 5 | 3 | 0 | 6 | 2 | 1 |
| 5 | 7 | 4 | 5 | 3 | 0 | 6 | 2 | 1 | 7 | 7 | 5 | 6 | 6 | 4 | 5 | 3 | 0 | 7 | 2 | 1 | 4 | 5 | 3 | 0 | 7 | 2 | 1 | 6 |
| | | | end initialize | | | | | | | 0 | | 1 | | | | | | | | | 5 | 3 | 0 | 7 | 2 | 1 | 6 | 4 |

The initialization of the array illustrated in Table 3 is performed using a key sequence of 1, 2, 4, 2, 7, 6, 3, 5 (these are the values of K[i]). The initialization for this example progresses through eight iterations, with each iteration producing an S array, an S-swap array (due to the swap operation in 3.3.4 and 3.3.5) and an S-shift array resulting from the shift operation. In 3.4, the array is shifted one extra time.

Hardware for performing the initialization procedure may include a 256-to-1 multiplexer for this embodiment (or in general, an N-to-1 multiplexer, wherein N is the number of elements in the array) for reading the value B from S[j]. Similarly, each array location may be associated with a comparator for the storing of the value A, which may be performed by sending A to each array position and comparing the value of j with the location indexes. When a match is found with between j and a given location index, the value of A is written into the corresponding location.

that in this embodiment, the values of A, B, V, and the amount of data encrypted in one iteration are each one byte (8 bits) in length. However, embodiments may be implemented using larger or smaller blocks of data. After the encryption is performed in this embodiment, the S array is shifted (4.10, item 320) so that the next value of A to be read is in the S[0] position for the next iteration, if any. A determination of whether any more data bytes are to be encrypted in item 322.

Table 4 below illustrates the generation of the V values for the encryption of Procedure 4, using the 8-element array initialized using Procedure 3.

TABLE 4

| S | | | | | | | | A | j | B | i | S swap | | | | | | | | g | V | S shift | | | | | | | |
|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | A | j | B | i | 0 | 1 | 2 | 3 | 4 | 5 | 6 | 7 | g | V | 0 | 1 | 2 | 3 | 4 | 5 | 6 | 7 |
| | | end initialize | | | | | | 1 | | 0 | | | | | | | | | | | | 5 | 3 | 0 | 7 | 2 | 1 | 6 | 4 |
| 5 | 3 | 0 | 7 | 2 | 1 | 6 | 4 | 5 | 4 | 2 | 1 | 2 | 3 | 0 | 7 | 5 | 1 | 6 | 4 | 6 | 6 | 3 | 0 | 7 | 5 | 1 | 6 | 4 | 2 |
| 3 | 0 | 7 | 5 | 1 | 6 | 4 | 2 | 3 | 6 | 4 | 2 | 4 | 0 | 7 | 5 | 1 | 6 | 3 | 2 | 5 | 6 | 4 | 0 | 7 | 5 | 1 | 6 | 3 | 2 |
| 0 | 7 | 5 | 1 | 6 | 3 | 2 | 4 | 0 | 5 | 3 | 3 | 3 | 7 | 5 | 1 | 6 | 0 | 2 | 4 | 0 | 3 | 7 | 5 | 1 | 6 | 0 | 2 | 4 | 3 |
| 7 | 5 | 1 | 6 | 0 | 2 | 4 | 3 | 7 | 3 | 6 | 4 | 6 | 5 | 1 | 7 | 0 | 2 | 4 | 3 | 1 | 5 | 5 | 1 | 7 | 0 | 2 | 4 | 3 | 6 |
| 5 | 1 | 7 | 0 | 2 | 4 | 3 | 6 | 5 | 7 | 6 | 5 | 6 | 1 | 7 | 0 | 2 | 4 | 3 | 5 | 6 | 3 | 1 | 7 | 0 | 2 | 4 | 3 | 5 | 6 |
| 1 | 7 | 0 | 2 | 4 | 3 | 5 | 6 | 1 | 7 | 6 | 6 | 6 | 7 | 0 | 2 | 4 | 3 | 5 | 1 | 1 | 7 | 7 | 0 | 2 | 4 | 3 | 5 | 1 | 6 |
| 7 | 0 | 2 | 4 | 3 | 5 | 1 | 6 | 7 | 5 | 5 | 7 | 5 | 0 | 2 | 4 | 3 | 7 | 1 | 6 | 5 | 7 | 0 | 2 | 4 | 3 | 7 | 1 | 6 | 5 |
| 0 | 2 | 4 | 3 | 7 | 1 | 6 | 5 | 0 | 4 | 7 | 0 | 7 | 2 | 4 | 3 | 0 | 1 | 6 | 5 | 7 | 5 | 2 | 4 | 3 | 0 | 1 | 6 | 5 | 7 |
| 2 | 4 | 3 | 0 | 1 | 6 | 5 | 7 | 2 | 5 | 6 | 1 | 6 | 4 | 3 | 0 | 1 | 2 | 5 | 7 | 7 | 7 | 4 | 3 | 0 | 1 | 2 | 5 | 7 | 6 |
| 4 | 3 | 0 | 1 | 2 | 5 | 7 | 6 | 4 | 0 | 4 | 2 | 4 | 3 | 0 | 1 | 2 | 5 | 7 | 6 | 6 | 7 | 3 | 0 | 1 | 2 | 5 | 7 | 6 | 4 |
| 3 | 0 | 1 | 2 | 5 | 7 | 6 | 4 | 3 | 2 | 1 | 3 | 1 | 0 | 3 | 2 | 5 | 7 | 6 | 4 | 1 | 0 | 0 | 3 | 2 | 5 | 7 | 6 | 4 | 1 |
| 0 | 3 | 2 | 5 | 7 | 6 | 4 | 1 | 0 | 1 | 3 | 4 | 3 | 0 | 2 | 5 | 7 | 6 | 4 | 1 | 7 | 1 | 0 | 2 | 5 | 7 | 6 | 4 | 1 | 3 |
| 0 | 2 | 5 | 7 | 6 | 4 | 1 | 3 | 0 | 0 | 0 | 5 | 0 | 2 | 5 | 7 | 6 | 4 | 1 | 3 | 3 | 7 | 2 | 5 | 7 | 6 | 4 | 1 | 3 | 0 |

Figure 3:
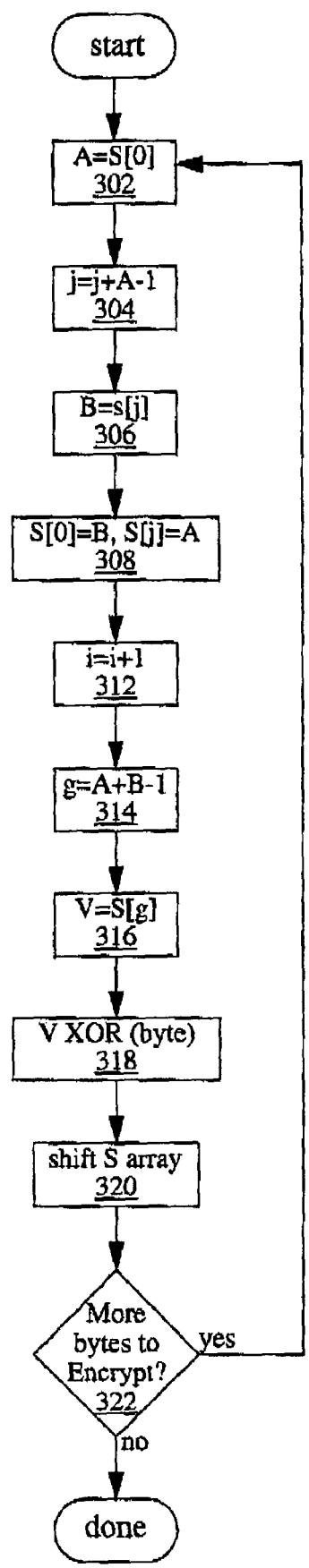
FIG. 3 is a flow diagram of one embodiment of a method of generating an encryption byte using array shifting.

Moving now to FIG. 3, a flow diagram of one embodiment of a method of generating an encryption byte using array shifting is shown. For the embodiment shown, method 300 corresponds to Procedure 4 shown below.

Figure 4:
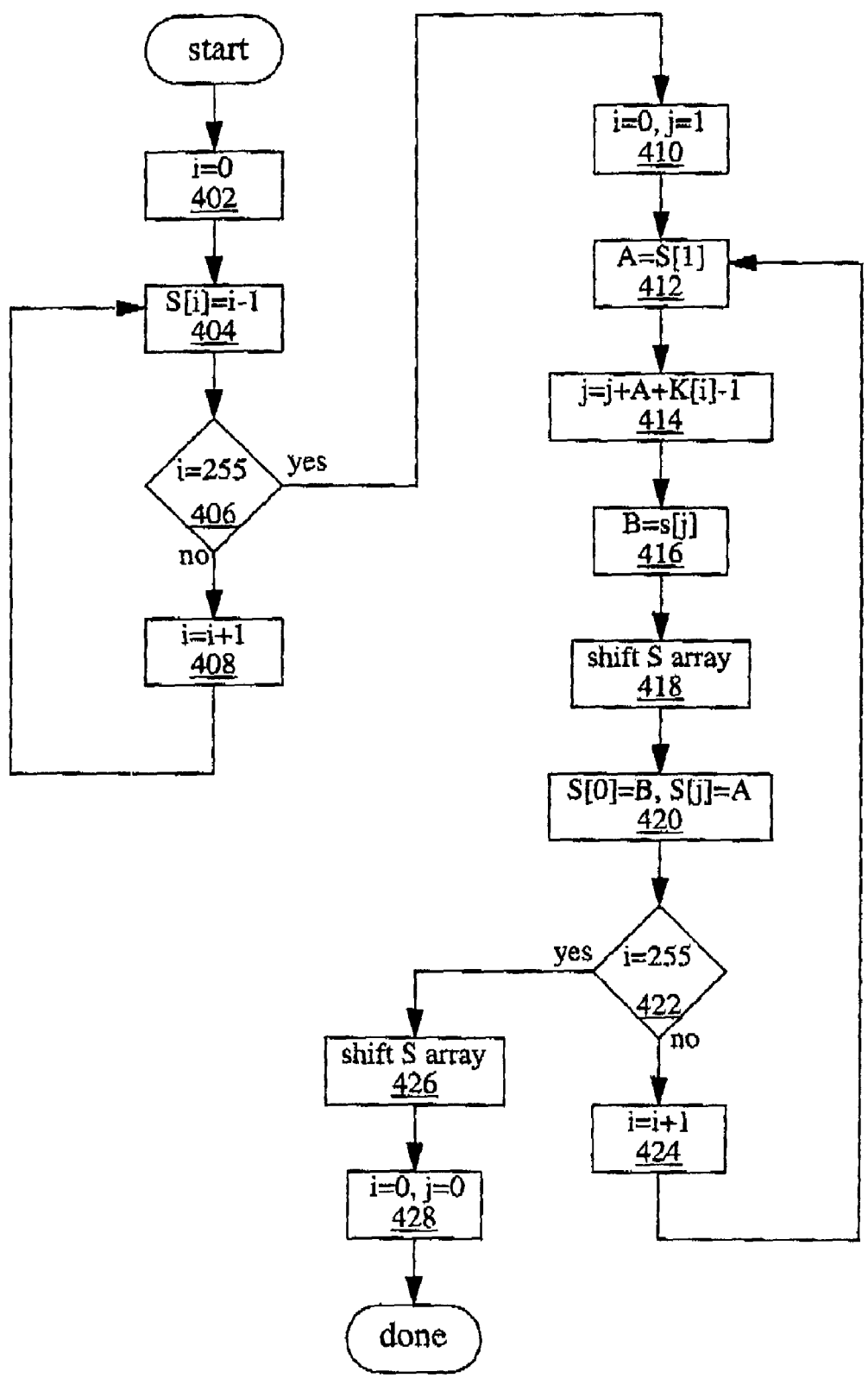
FIG. 4 is a flow diagram of another embodiment of initializing an array for an encryption algorithm using array shifting.

FIG. 4 is a flow diagram of another embodiment of initializing an array for an encryption algorithm using array shifting. Method 400 of FIG. 4 is associated with Procedure 5 below.

| Procedure 4 | |
|---|---|
| 4.1: | A = S[0] |
| 4.2: | j = j + A − 1 |
| 4.3: | B = S[j] |
| 4.4: | S[0] = B |
| 4.5: | S[j] = A |
| 4.6: | i = i + 1 |
| 4.7: | g = A + B − i |
| 4.8: | V = S[g] |
| 4.9: | result = K XOR (the next byte to be encrypted) |
| 4.10: | shift the S array (i.e., for all k, S[k] <− S[k + 1]) |

| Procedure 5 |
|---|
| 5.1: for i = 0 to 255, S[i] = i |
| 5.2: j = 1 |
| 5.3: for i = 0 to 255 do the following: |
|    5.3.1: A = S[0] |
|    5.3.2: j = j + A + K[i] − 1 |
|    5.3.3: B = S[j] |
|    5.3.4: shift the S array (i.e., for all k, S[k] <− S[k+1]) |
|    5.3.5: S[255] = B |
|    5.3.6: S[j−1] = A |
| 5.4: shift the S array (i.e., for all k, S[k] <− S[k+1]) |
| 5.5: i = 1 |
| 5.6: j = 0 |

Method 300 begins with the reading of the value A from the first position of the array, S[0] (4.2, item 302). As with the initialization procedure discussed above, the value of A is read from the first array position for each iteration of the encryption performed by Procedure 4. After reading value A from the array, the index value j is calculated using the equation j=j+A −1 (4.2, item 304). Using the calculated value of index value j, the value B is determined by reading the S[j] position of the array (4.3, item 306). A swap operation is then performed in 4.4 and 4.5 (item 308) by writing the value A to S[j] and value B to S[0]. In 4.6 (item 312), index value i is incremented.

In 4.7 (item 314), the index value g is calculated using the equation g=A+B −i. Using the index value g, the value V is read from the g$^{th}$ position of the array, S[g] (4.8, item 316). After reading the value of V from the array, a data byte is encrypted by XORing it with V (4.9, item 318). It is noted Procedure 5 is similar to array initialization Procedure 3 discussed above. However, instead of shifting the array at the end of the loop as in Procedure 3, the array is shifted after determining the value B. In general, the array shifting may be done any time within the loop. However, changing the point in the procedure when the array is shifted may alter some of its steps. In the case of Procedure 5, the steps prior to shifting the array are identical to those of Procedure 3 (e.g., A is read from the first array position S[0], index value j is computed in the same manner, etc.). The swap operation in Procedure 5 is performed by assigning the value B to the last position in the array, S[255], and assigning the value of A to the S[j−1] position of the array. This is because that the locations where A and B are stored have moved due to the shifting of the array just after obtaining B. The shift operation places the value of A in S[255] and the value of B is shifted from the S[j] position to the S[j−1] position. Thus, the swap is conducted by exchanging the values in these positions.

Procedure 5 also differs from Procedure 3 in that the index value i is set to one while the index value j is reset to zero in the procedure's final steps. The setting of i=1 in 5.5 (item 426) may simplify the computation in 6.8 of Procedure 6 (discussed below).

Table 5 illustrates the initialization using an exemplary 8-element array for the sake of simplicity.

Procedure 6 may be used to perform encryption utilizing an array generated according to Procedure 5 above. Procedure 6 is similar to Procedure 5 in that the shifting operation (6.4, item 508) occurs just after the fetching of value B from the array. As such, the swap operation is performed in the same manner as in Procedure 5, with value B being written into the S[255] position and the value A being written into the S[j−1] position. The remainder of the procedure includes the incrementing of index value i (6.7, item 514), calculating index value g (6.8, item 516), reading a value of V from the

TABLE 5

| key | S | | | | | | | | i | A | j | B | S shift | | | | | | | | S swap | | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- | --- |
|  | 0 | 1 | 2 | 3 | 4 | 5 | 6 | 7 |  |  |  |  | 0 | 1 | 2 | 3 | 4 | 5 | 6 | 7 | 0 | 1 | 2 | 3 | 4 | 5 | 6 | 7 |
|  | initialize | | | | | | | | | | 1 | | | | | | | | | | 0 | 1 | 2 | 3 | 4 | 5 | 6 | 7 |
| 1 | 0 | 1 | 2 | 3 | 4 | 5 | 6 | 7 | 0 | 0 | 1 | 1 | 1 | 2 | 3 | 4 | 5 | 6 | 7 | 0 | 0 | 2 | 3 | 4 | 5 | 6 | 7 | 1 |
| 2 | 0 | 2 | 3 | 4 | 5 | 6 | 7 | 1 | 1 | 0 | 2 | 3 | 2 | 3 | 4 | 5 | 6 | 7 | 1 | 0 | 2 | 0 | 4 | 5 | 6 | 7 | 1 | 3 |
| 4 | 2 | 0 | 4 | 5 | 6 | 7 | 1 | 3 | 2 | 2 | 7 | 3 | 0 | 4 | 5 | 6 | 7 | 1 | 3 | 2 | 0 | 4 | 5 | 6 | 7 | 1 | 2 | 3 |
| 2 | 0 | 4 | 5 | 6 | 7 | 1 | 2 | 3 | 3 | 0 | 0 | 0 | 4 | 5 | 6 | 7 | 1 | 2 | 3 | 0 | 4 | 5 | 6 | 7 | 1 | 2 | 3 | 0 |
| 7 | 4 | 5 | 6 | 7 | 1 | 2 | 3 | 0 | 4 | 4 | 2 | 6 | 5 | 6 | 7 | 1 | 2 | 3 | 0 | 4 | 5 | 4 | 7 | 1 | 2 | 3 | 0 | 6 |
| 6 | 5 | 4 | 7 | 1 | 2 | 3 | 0 | 6 | 5 | 5 | 4 | 2 | 4 | 7 | 1 | 2 | 3 | 0 | 6 | 5 | 4 | 7 | 1 | 5 | 3 | 0 | 6 | 2 |
| 3 | 4 | 7 | 1 | 5 | 3 | 0 | 6 | 2 | 6 | 4 | 2 | 1 | 7 | 1 | 5 | 3 | 0 | 6 | 2 | 4 | 7 | 4 | 5 | 3 | 0 | 6 | 2 | 1 |
| 5 | 7 | 4 | 5 | 3 | 0 | 6 | 2 | 1 | 7 | 7 | 5 | 6 | 4 | 5 | 3 | 0 | 6 | 2 | 1 | 7 | 4 | 5 | 3 | 0 | 7 | 2 | 1 | 6 |
|  | end initialize | | | | | | | | | 1 | | 0 | | | | | | | | | 5 | 3 | 0 | 7 | 2 | 1 | 6 | 4 |

Figure 5:
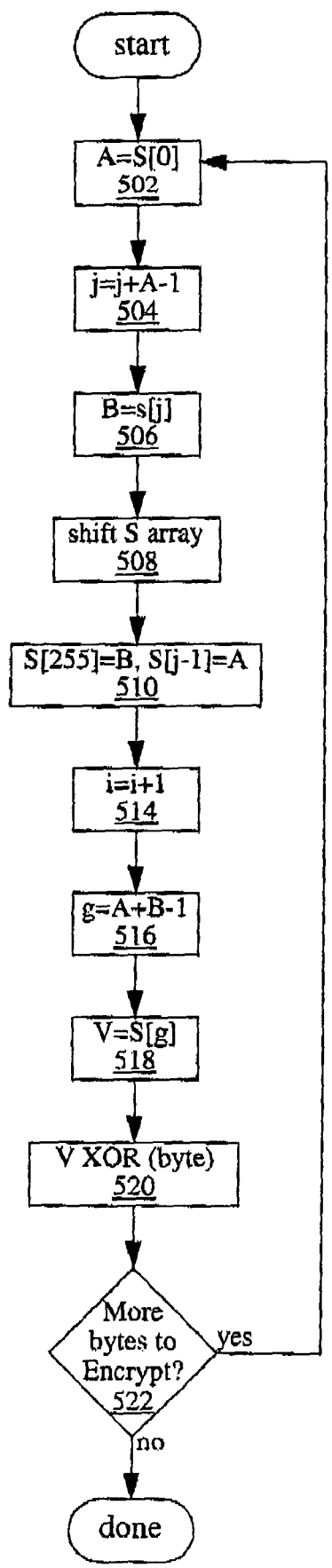
FIG. 5 is a flow diagram of another embodiment of a method of generating an encryption byte using array shifting.

Turning now to FIG. 5, a flow diagram of another embodiment of a method of generating an encryption byte using array shifting is shown. Method 500 shown in FIG. 5 is associated with the encryption algorithm of Procedure 6 shown below.

Procedure 6

6.1: A = S[0]
6.2: j = j + A − 1
6.3: B = S[j]
6.4: shift the S array (i.e., for all k, S[k] <− S[k+1])
6.5: S[255] = B
6.6: S[j−1] = A
6.7: i = i + 1
6.8: g = A + B − i
6.9: V = S[g]
6.10: result = V XOR (the next byte to be encrypted)

g position of the array (6.9, item 518), and XORing V with a byte of data to be encrypted (6.10, item 520). In item 522, a determination is made as to whether more data bytes are to be encrypted, and if so, the method returns to item 502 (corresponding to 6.1 of the procedure). It should be noted that while the maximum value of i in this embodiment is 255, this does not imply that the procedure is capable of incrementing only 256 bytes of information. When the index value i reaches its maximum value in an iteration, the addition of 1 in the modulo system results in the value of zero and thus encryption may continue until all desired information is encrypted.

Table 6 below illustrates the generation of the V values for encryption performed by Procedure 6 using the array initialized in the example associated with Procedure 5.

TABLE 6

| S | | | | | | | | A | j | B | i | S shift | | | | | | | | S swap | | | | | | | | g | V |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| 0 | 1 | 2 | 3 | 4 | 5 | 6 | 7 |  |  |  |  | 0 | 1 | 2 | 3 | 4 | 5 | 6 | 7 | 0 | 1 | 2 | 3 | 4 | 5 | 6 | 7 |  |  |
|  | end initialize | | | | | | | | 0 | | 1 | | | | | | | | | 5 | 3 | 0 | 7 | 2 | 1 | 6 | 4 | | |
| 5 | 3 | 0 | 7 | 2 | 1 | 6 | 4 | 5 | 4 | 2 | 2 | 3 | 0 | 7 | 2 | 1 | 6 | 4 | 5 | 3 | 0 | 7 | 5 | 1 | 6 | 4 | 2 | 5 | 6 |
| 3 | 0 | 7 | 5 | 1 | 6 | 4 | 2 | 3 | 6 | 4 | 3 | 0 | 7 | 5 | 1 | 6 | 4 | 2 | 3 | 0 | 7 | 5 | 1 | 6 | 3 | 2 | 4 | 4 | 6 |
| 0 | 7 | 5 | 1 | 6 | 3 | 2 | 4 | 0 | 5 | 3 | 4 | 7 | 5 | 1 | 6 | 3 | 2 | 4 | 0 | 7 | 5 | 1 | 6 | 0 | 2 | 4 | 3 | 7 | 3 |
| 7 | 5 | 1 | 6 | 0 | 2 | 4 | 3 | 7 | 3 | 6 | 5 | 5 | 1 | 6 | 0 | 2 | 4 | 3 | 7 | 5 | 1 | 7 | 0 | 2 | 4 | 3 | 6 | 0 | 5 |
| 5 | 1 | 7 | 0 | 2 | 4 | 3 | 6 | 5 | 7 | 6 | 6 | 1 | 7 | 0 | 2 | 4 | 3 | 6 | 5 | 1 | 7 | 0 | 2 | 4 | 3 | 5 | 6 | 5 | 3 |
| 1 | 7 | 0 | 2 | 4 | 3 | 5 | 6 | 1 | 7 | 6 | 7 | 7 | 0 | 2 | 4 | 3 | 5 | 6 | 1 | 7 | 0 | 2 | 4 | 3 | 5 | 1 | 6 | 0 | 7 |
| 7 | 0 | 2 | 4 | 3 | 5 | 1 | 6 | 7 | 5 | 5 | 0 | 0 | 2 | 4 | 3 | 5 | 1 | 6 | 7 | 0 | 2 | 4 | 3 | 7 | 1 | 6 | 5 | 4 | 7 |
| 0 | 2 | 4 | 3 | 7 | 1 | 6 | 5 | 0 | 4 | 7 | 1 | 2 | 4 | 3 | 7 | 1 | 6 | 5 | 0 | 2 | 4 | 3 | 0 | 1 | 6 | 5 | 7 | 6 | 5 |
| 2 | 4 | 3 | 0 | 1 | 6 | 5 | 7 | 2 | 5 | 6 | 2 | 4 | 3 | 0 | 1 | 6 | 5 | 7 | 2 | 4 | 3 | 0 | 1 | 2 | 5 | 7 | 6 | 6 | 7 |
| 4 | 3 | 0 | 1 | 2 | 5 | 7 | 6 | 4 | 0 | 4 | 3 | 3 | 0 | 1 | 2 | 5 | 7 | 6 | 4 | 3 | 0 | 1 | 2 | 5 | 7 | 6 | 4 | 5 | 7 |
| 3 | 0 | 1 | 2 | 5 | 7 | 6 | 4 | 3 | 2 | 1 | 4 | 0 | 1 | 2 | 5 | 7 | 6 | 4 | 3 | 0 | 3 | 2 | 5 | 7 | 6 | 4 | 1 | 0 | 0 |
| 0 | 3 | 2 | 5 | 7 | 6 | 4 | 1 | 0 | 1 | 3 | 5 | 3 | 2 | 5 | 7 | 6 | 4 | 1 | 0 | 0 | 2 | 5 | 7 | 6 | 4 | 1 | 3 | 6 | 1 |
| 0 | 2 | 5 | 7 | 6 | 4 | 1 | 3 | 0 | 0 | 6 | 2 | 2 | 5 | 7 | 6 | 4 | 1 | 3 | 0 | 2 | 5 | 7 | 6 | 4 | 1 | 3 | 0 | 2 | 7 |

Figure 6:
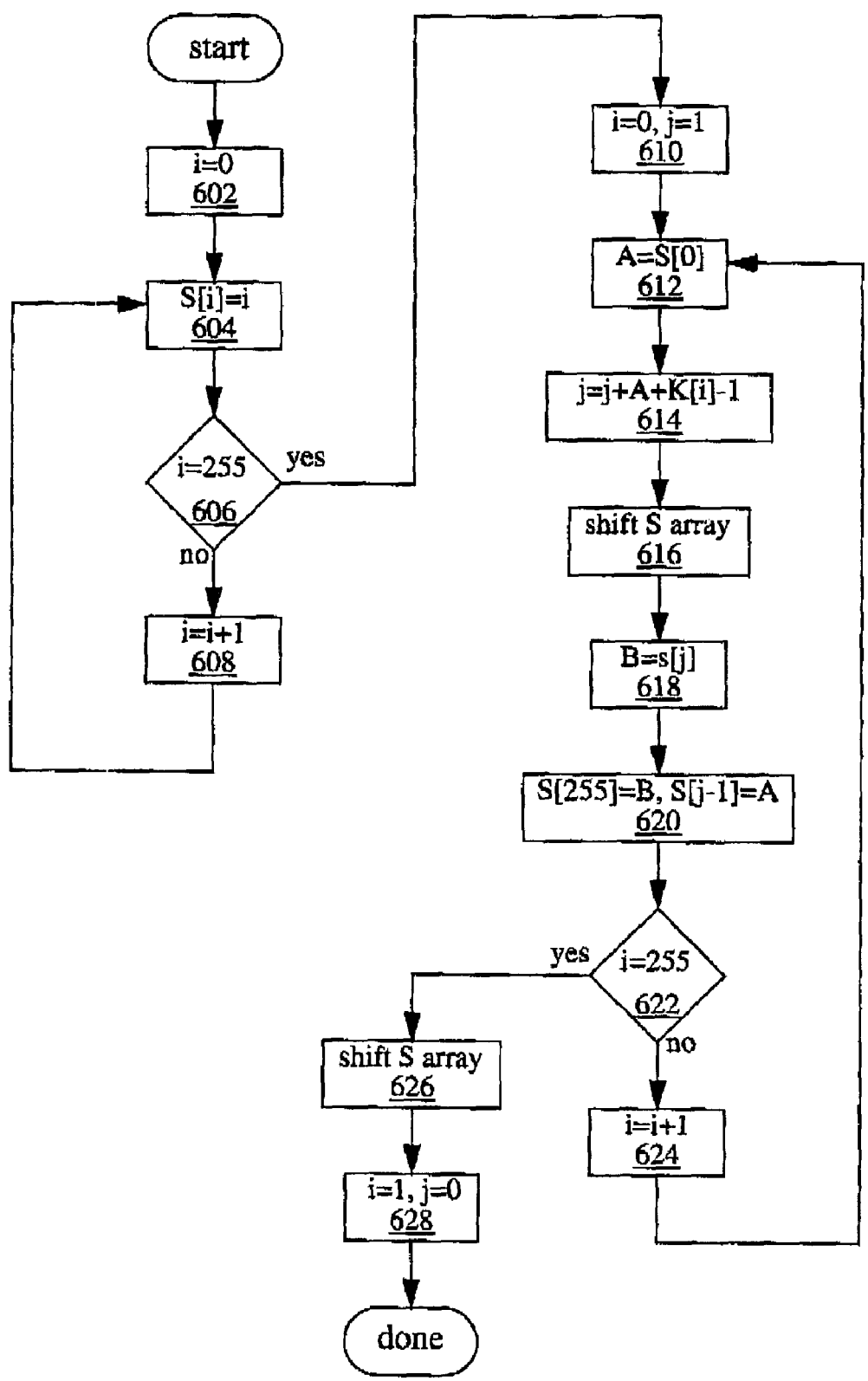
FIG. 6 is a flow diagram of another embodiment of initializing an array for an encryption algorithm using array shifting.

FIG. 6 is a flow diagram of another embodiment of initializing an array for an encryption algorithm using array shifting. Method 600 shown in FIG. 6 is associated with Procedure 7 below. Although similar to the above array initialization procedures, Procedure 7 differs in that the shifting of the array occurs before the reading of the value B.

As with the procedures discussed above, an extra shift occurs after exiting the loop (7.4, item 626). Also, index values i and j are reset to zero after exiting the loop.

Figure 7:
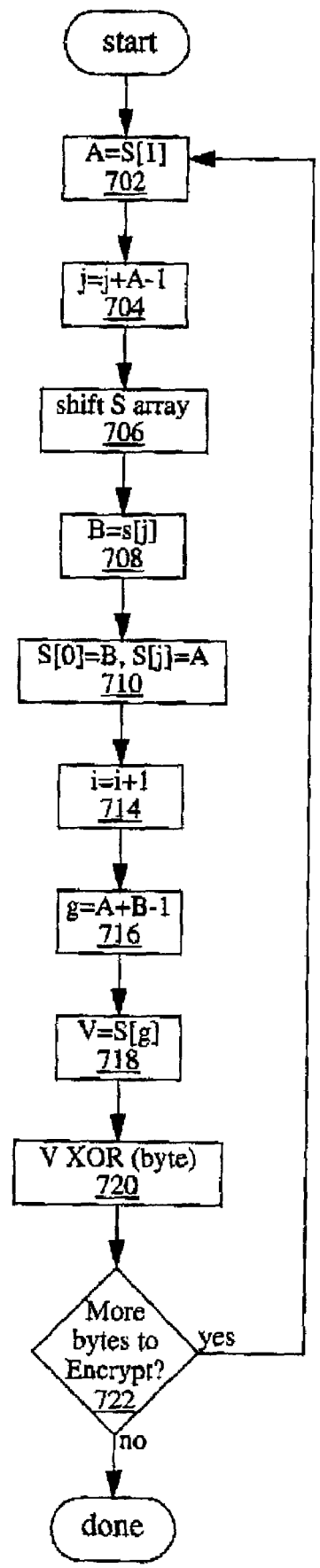
FIG. 7 is a flow diagram of another embodiment of a method of generating an encryption byte using array shifting.

Moving now to FIG. 7, a flow diagram of another embodiment of a method of generating an encryption byte using array shifting is shown. The encryption procedure of method 700 is associated with Procedure 8 shown below.

---
Procedure 7
---
7.1: for i = 0 to 255, S[i] = i−1
7.2: j = 1
7.3: for i = 0 to 255 do the following:
    7.3.1: A = S[1]
    7.3.2: j = j + A + K[i] − 1
    7.3.3: shift the S array (i.e., for all k, S[k] <− S[k+1])
    7.3.4: B = S[j]
    7.3.5: S[0] = B
    7.3.6: S[j] = A
7.4: shift the S array (i.e., for all k, S[k] <− S[k+1])
7.5: i = 0
7.6: j = 0

---
Procedure 8
---
8.1. A = S[1]
8.2. j = j + A − 1
8.3. shift the S array (i.e., for all k, S[k] <− S[k+1])
8.4. B = S[j]
8.5. S[0] = B
8.6. S[j] = A
8.7. i = i + 1
8.8. g = A + B − i
8.9. V = S[g]
8.10. result = V XOR (the next byte to be encrypted)

---

Table 7 below illustrates the performance of Procedure 7 using an exemplary 8-element array.

TABLE 7

| key | S 0 | 1 | 2 | 3 | 4 | 5 | 6 | 7 | i | A | j | S shift 0 | 1 | 2 | 3 | 4 | 5 | 6 | 7 | B | S swap 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|
| | | | initialize | | | | | | | | 1 | | | | | | | | | | 7 | 0 | 1 | 2 | 3 | 4 | 5 | 6 |
| 1 | 7 | 0 | 1 | 2 | 3 | 4 | 5 | 6 | 0 | 0 | 1 | 0 | 1 | 2 | 3 | 4 | 5 | 6 | 7 | 1 | 1 | 0 | 2 | 3 | 4 | 5 | 6 | 7 |
| 2 | 1 | 0 | 2 | 3 | 4 | 5 | 6 | 7 | 1 | 0 | 2 | 0 | 2 | 3 | 4 | 5 | 6 | 7 | 1 | 3 | 3 | 2 | 0 | 4 | 5 | 6 | 7 | 1 |
| 4 | 3 | 2 | 0 | 4 | 5 | 6 | 7 | 1 | 2 | 2 | 7 | 2 | 0 | 4 | 5 | 6 | 7 | 1 | 3 | 3 | 3 | 0 | 4 | 5 | 6 | 7 | 1 | 2 |
| 2 | 3 | 0 | 4 | 5 | 6 | 7 | 1 | 2 | 3 | 0 | 0 | 0 | 4 | 5 | 6 | 7 | 1 | 2 | 3 | 0 | 0 | 4 | 5 | 6 | 7 | 1 | 2 | 3 |
| 7 | 0 | 4 | 5 | 6 | 7 | 1 | 2 | 3 | 4 | 4 | 2 | 4 | 5 | 6 | 7 | 1 | 2 | 3 | 0 | 6 | 6 | 5 | 4 | 7 | 1 | 2 | 3 | 0 |
| 6 | 6 | 5 | 4 | 7 | 1 | 2 | 3 | 0 | 5 | 5 | 4 | 5 | 4 | 7 | 1 | 2 | 3 | 0 | 6 | 2 | 2 | 4 | 7 | 1 | 5 | 3 | 0 | 6 |
| 3 | 2 | 4 | 7 | 1 | 5 | 3 | 0 | 6 | 6 | 4 | 2 | 4 | 7 | 1 | 5 | 3 | 0 | 6 | 2 | 1 | 1 | 7 | 4 | 5 | 3 | 0 | 6 | 2 |
| 5 | 1 | 7 | 4 | 5 | 3 | 0 | 6 | 2 | 7 | 7 | 5 | 7 | 4 | 5 | 3 | 0 | 6 | 2 | 1 | 6 | 6 | 4 | 5 | 3 | 0 | 7 | 2 | 1 |
| | | | end initialize | | | | | | 0 | | 0 | | | | | | | | | | 4 | 5 | 3 | 0 | 7 | 2 | 1 | 6 |

Since the array is shifted after determining the index value j but prior to reading the value B from the S[j] location in the array, the value A is read from the S[1] position in this embodiment (7.3.1, item 612). Thus, when the swap operation occurs in 7.3.5 and 7.3.6 (items 612 and 614, respectively), B can be written into the S[0] position and A can be written into the S[j] position. This ensures that the correct values of A and B will be read for subsequent iterations of the loop.

Procedure 8 is associated with array initialization Procedure 7, and thus the shifting of the array (8.3, item 706) occurs just after calculating the index value j (8.2, item 704). An example of the generation of the V values using Procedure 8 using the array initialized in the example associated with Procedure 7 is shown below in Table 8.

TABLE 8

| S 0 | 1 | 2 | 3 | 4 | 5 | 6 | 7 | A | j | S shift 0 | 1 | 2 | 3 | 4 | 5 | 6 | 7 | B | i | S swap 0 | 1 | 2 | 3 | 4 | 5 | 6 | 7 | g | V |
|---|---|---|---|---|---|---|---|---|---|---|---|---|---|---|---|---|---|---|---|---|---|---|---|---|---|---|---|---|---|
| | | end initialize | | | | | | | | | | | | | | | | | 0 | 4 | 5 | 3 | 0 | 7 | 2 | 1 | 6 | | 0 |
| 4 | 5 | 3 | 0 | 7 | 2 | 1 | 6 | 5 | 4 | 5 | 3 | 0 | 7 | 2 | 1 | 6 | 4 | 2 | 1 | 2 | 3 | 0 | 7 | 5 | 1 | 6 | 4 | 6 | 6 |
| 2 | 3 | 0 | 7 | 5 | 1 | 6 | 4 | 3 | 6 | 3 | 0 | 7 | 5 | 1 | 6 | 4 | 2 | 4 | 2 | 4 | 0 | 7 | 5 | 1 | 6 | 3 | 2 | 5 | 6 |
| 4 | 0 | 7 | 5 | 1 | 6 | 3 | 2 | 0 | 5 | 0 | 7 | 5 | 1 | 6 | 3 | 2 | 4 | 3 | 3 | 3 | 7 | 5 | 1 | 6 | 0 | 2 | 4 | 0 | 3 |
| 3 | 7 | 5 | 1 | 6 | 0 | 2 | 4 | 7 | 3 | 7 | 5 | 1 | 6 | 0 | 2 | 4 | 3 | 6 | 4 | 6 | 5 | 1 | 7 | 0 | 2 | 4 | 3 | 1 | 5 |
| 6 | 5 | 1 | 7 | 0 | 2 | 4 | 3 | 5 | 7 | 5 | 1 | 7 | 0 | 2 | 4 | 3 | 6 | 6 | 5 | 6 | 1 | 7 | 0 | 2 | 4 | 3 | 5 | 6 | 3 |
| 6 | 1 | 7 | 0 | 2 | 4 | 3 | 5 | 1 | 7 | 1 | 7 | 0 | 2 | 4 | 3 | 5 | 6 | 6 | 6 | 7 | 0 | 2 | 4 | 3 | 5 | 1 | 1 | 7 |
| 6 | 7 | 0 | 2 | 4 | 3 | 5 | 1 | 7 | 5 | 7 | 0 | 2 | 4 | 3 | 5 | 1 | 6 | 5 | 7 | 5 | 0 | 2 | 4 | 3 | 7 | 1 | 6 | 5 | 7 |
| 5 | 0 | 2 | 4 | 3 | 7 | 1 | 6 | 0 | 4 | 0 | 2 | 4 | 3 | 7 | 1 | 6 | 5 | 7 | 0 | 7 | 2 | 4 | 3 | 0 | 1 | 6 | 5 | 7 | 5 |
| 7 | 2 | 4 | 3 | 0 | 1 | 6 | 5 | 2 | 5 | 2 | 4 | 3 | 0 | 1 | 6 | 5 | 7 | 6 | 1 | 6 | 4 | 3 | 0 | 1 | 2 | 5 | 7 | 7 | 7 |

TABLE 8-continued

| S | | | | | | | | A | j | S shift | | | | | | | | B | i | S swap | | | | | | | | g | V |
|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | A | j | 0 | 1 | 2 | 3 | 4 | 5 | 6 | 7 | B | i | 0 | 1 | 2 | 3 | 4 | 5 | 6 | 7 | g | V |
| 6 | 4 | 3 | 0 | 1 | 2 | 5 | 7 | 4 | 0 | 4 | 3 | 0 | 1 | 2 | 5 | 7 | 6 | 4 | 2 | 4 | 3 | 0 | 1 | 2 | 5 | 7 | 6 | 6 | 7 |
| 4 | 3 | 0 | 1 | 2 | 5 | 7 | 6 | 3 | 2 | 3 | 0 | 1 | 2 | 5 | 7 | 6 | 4 | 1 | 3 | 1 | 0 | 3 | 2 | 5 | 7 | 6 | 4 | 1 | 0 |
| 1 | 0 | 3 | 2 | 5 | 7 | 6 | 4 | 0 | 1 | 0 | 3 | 2 | 5 | 7 | 6 | 4 | 1 | 3 | 4 | 3 | 0 | 2 | 5 | 7 | 6 | 4 | 1 | 7 | 1 |
| 3 | 0 | 2 | 5 | 7 | 6 | 4 | 1 | 0 | 0 | 0 | 2 | 5 | 7 | 6 | 4 | 1 | 3 | 0 | 5 | 0 | 2 | 5 | 7 | 6 | 4 | 1 | 3 | 3 | 7 |

In general, a variety of embodiments of the procedures discussed above are possible. As previously noted, the array may be shifted at any time during the procedure providing the appropriate modifications are made to ensure that A and B are read from (and written into) the correct location. Furthermore, the shifting of the array during the execution of these procedures allows value A to be read from the same array location with each iteration. Reading A from the same location each iteration may significantly reduce the amount of delay present in comparison to embodiments where A may be read from a different location in each iteration. Furthermore, reading A from the same location each iteration may allow for the elimination of some circuitry, such as an array of multiplexers forming an N-to-1 multiplexer (where N is the number of array elements, e.g., 256) may also be eliminated.

Pipelining Using Array Shifting

The procedures described above that involve array shifting may be implemented in a pipeline (although array shifting is not necessarily required to implement a pipeline). For each iteration of the encryption procedure, there are three values that are obtained from the array: A, B, and V. For one type of hardware implementation, an N-to-1 multiplexer may be used to obtain a value from an arbitrary position in the array, where N is the number of elements (e.g. 256). An N-to-1 multiplexer may be implemented using an array of multiplexers, such as that shown in FIG. 1. However, in embodiments wherein array shifting occurs, A may be read from the same array position for each iteration of the procedure being performed. Thus, N-to-1 multiplexers may be required only for the reading of the values B and V.

Figure 8:
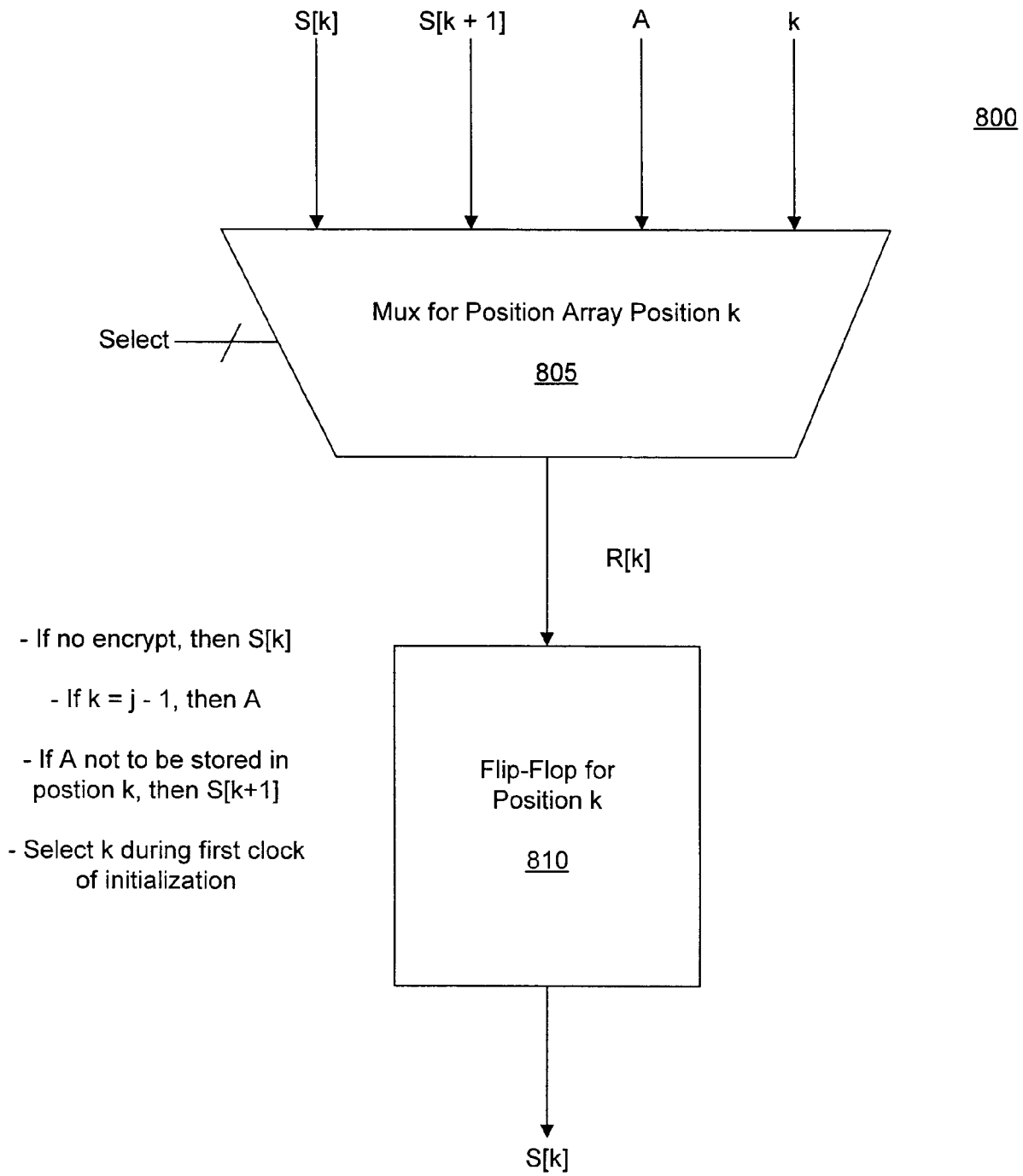
FIG. 8 is a block diagram of one embodiment of a circuit used as a building block in creating a pipeline for an encryption algorithm.
Figure 9:
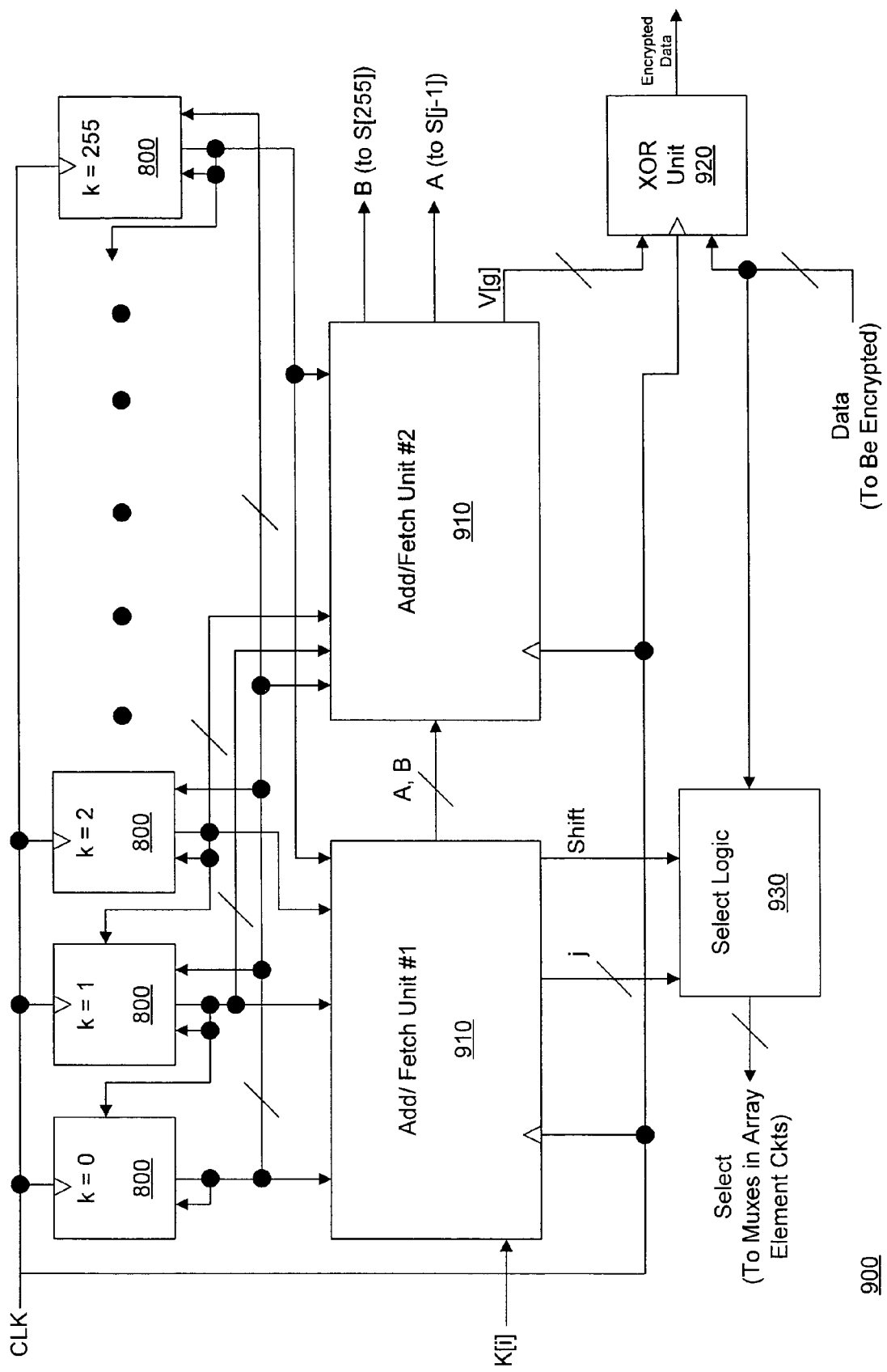
FIG. 9 is a block diagram of one embodiment of a pipelining circuit for an encryption algorithm utilizing array shifting.
Figure 10:
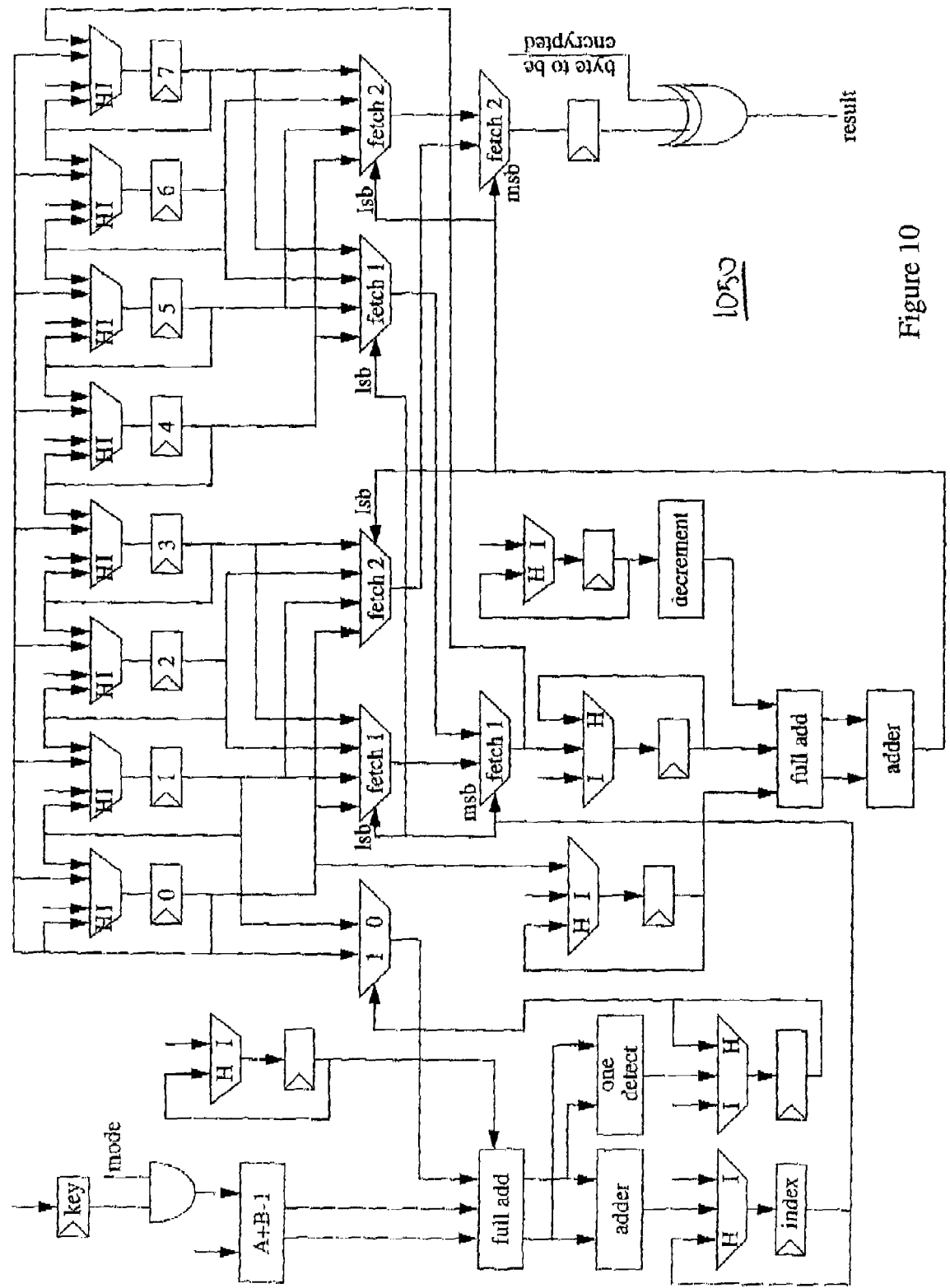
FIG. 10 is a schematic diagram of an exemplary embodiment of a circuit that may be used for pipelining an encryption algorithm.

FIGS. 8, 9 and 10 illustrate embodiments of hardware implementations that may be used to pipeline the initialization and encryption procedures. FIG. 8 is associated with all shifting array embodiments. FIG. 9 is associated with initialization Procedure 5 and encryption Procedure 6. During initialization, FIG. 10 is associated with Procedure 7 up through step 7.3.4 and then with Procedure 5 from step 5.3.3. During encryption, FIG. 10 is associated with Procedure 8 up through step 8.4 and then with Procedure 6 from step 6.3. However, it should be noted that embodiments based on the other initialization and encryption procedures are also possible and contemplated (including those disclosed herein), and may be realized with modifications to the embodiments shown.

Turning now to FIG. 8, a block diagram of one embodiment of a circuit used as a building block in creating a pipeline for an encryption algorithm is shown. In the embodiment shown array element circuit (AEC) 800 includes multiplexer 805 and flip-flop 810. Although single-bit implementations of the multiplexer and flip-flop are shown here, the circuit may be considered to be a multi-bit implementation having the bit-width of a value stored in an array element (e.g. 8 bits). Alternatively, the diagram may be viewed as being associated one of a plurality of bits in a given bit position.

In the embodiment shown, multiplexer 805 is a 4-to-1 multiplexer with inputs for S[k], S[k+1], A, and k. A value of k is selected only on the first clock cycle of an initialization procedure, and implements the entire first loop of FIG. 4 since it is applied simultaneously to all positions of the S array. The output R[k] of multiplexer 805 is coupled to the input of flip-flop 810. Flip-flop 810 is one of many different types of storage devices that may be used to store values for an array.

The value of S[k] is selected during the encryption procedure when there is no data to encrypt for a particular iteration. Thus, the S[k] input to the multiplexer is coupled to the output of flip-flop 810.

During shift operations, the value of S[k+1] is selected. When this selection is made, multiplexer 805 will allow a value stored in the next element of the array to propagate through to flip-flop 810. For example, when this selection is made, the value stored in S[3] is written into S[2], the value stored (prior to being overwritten by the value from S[3]) in S[2] is written to S[1], and so forth. Therefore, selecting of the S[k+1] input allows the shift operation to take place.

The selection of the A input allows the value of A to be written into the array location during the swap operation. In this particular embodiment, A is written to S[j−1] location. The embodiment in which AEC 800 is implemented may function by sending value A to the multiplexer select inputs for each element in the array while sending the value of (j−1) to a comparator (not shown) in each AEC 800. When the comparator finds a match with the array element corresponding the value of (j−1), the value of A may be selected by the multiplexer inputs, thereby allowing it to propagate through to be stored in the flip-flops.

As previously noted, the embodiment shown herein may be associated with Procedures 5 and 6, and thus the value of B is always written into the S[255] position. However, the embodiment shown herein may be modified for other ones of the procedures presented herein. For example, the A input to the multiplexer may be coupled to allow either the values of A or B to propagate through for embodiments where B may be written to any one of the array elements during the swap operation.

Moving to FIG. 9, a block diagram of one embodiment of a pipelining circuit for an encryption algorithm utilizing array shifting is shown. The embodiment shown here in FIG. 9 is associated with Procedures 5 and 6, although alternate embodiments designed to work with other procedures including those disclosed herein are possible and contemplated.

Encryption circuit 900 includes a plurality of AECs 800, one for each element of the array. Each AEC 800 may include multiplexers for selection, flip-flops for storage, and may also include comparison logic for comparing a received index value with the index value of that particular array position. An output of each of the AECs 800s is fed back to an input so that the value of that array position can be maintained for any iteration wherein no data value is to be encrypted (e.g. when S[k] is selected as discussed above). A majority of the elements also have an input that is coupled to the output of a next element in the array. This allows the shifting operation to take place when the S[k+1] input is selected as discussed above. The first element of the array [k=0] may be coupled to an input of each of the AECs 800. This may allow the value of A to be written into an AEC 800 that corresponds with the [j−1] element of the array during the swap operation. Alternatively, the value of A may be received from add/fetch unit #2 (910) as will be discussed in further detail below.

Encryption circuit 900 includes two add/fetch units 910 that may perform similar functions. Each add/fetch unit 910 may make up one or more pipeline stages. For example, add/fetch unit #1 may comprise the first pipeline stage for two-stage pipelines, or the first two pipeline stages for the 4-stage pipelines. Add/fetch unit #2 may comprise the 2nd pipeline stage for 2-stage embodiments or the 3rd and 4th stages for 4-stage embodiments.

Add/fetch unit #1 is coupled to receive the output provided by each of the AEC's of the array, and thus may include an array of multiplexers for elements 0-255. Add/fetch unit 1 is coupled to read value A from the AEC 0, calculate index value j, and subsequently fetch value B from the S[j] position of the array. Add fetch unit #1 is also coupled to receive a key sequence through the K[i] input during the initialization process In addition, add/fetch unit is configured to generate a 'shift' signal which initiates the shifting.

Add/fetch unit #2 is coupled to receive the values A and B from add/fetch unit #1. In this particular embodiment, add/fetch unit #2 is coupled to write B into S[255] and A into S[j−1] when during a swap operation. In other embodiments based on different initialization and encryption procedures, add/fetch unit #2 may be coupled to write values A and B to locations other than S[j−1] and S[255], respectively. Add/fetch unit #2 also increments index value i and calculates index value g. Upon calculating the index value g, add/fetch unit #2 may fetch the value V[g] from the array. V[g] is then provided as an output to XOR unit 920, where it is XOR'ed with the data byte to be encrypted for that iteration.

Select logic 930 is coupled to receive the calculated index value j from add fetch unit #1, and in turn calculate [j−1] to determine which element A is to be written into during a swap operation. Select logic 930 is also coupled to receive a shift signal from add/fetch unit. When asserted, the shift signal invokes a shift of the array, and thus select logic 930 provides signals to the select inputs of multiplexers in AEC's 800 in order to cause the values of each S[k+1] to be stored in the S[k] position (with the exception of S[255], which stored the value previously held in S[0]). In one embodiment, select logic 930 may provide signals separately to each AEC 800 in order to allow elements to be written into individually (as when A is written to the S[j−1] position during a swap). Alternatively, each AEC 800 may include comparison logic that allows the select signals to propagate to the multiplexer select inputs, and may thus allow an array element to be addressed individually such that A (and/or B in some embodiments) can be written to a desired array position for a swap operation. Select logic 930 may also receive a signal associated with the information to be encrypted indicating that no data is to be encrypted on a given iteration.

Each of the various components of encryption circuit 900 is coupled to receive a clock signal. In embodiments wherein a 2-stage pipeline is implemented, the functions of each of the add/fetch units 910 may be performed in a single clock cycle. For embodiments implementing a 4-stage pipeline, the functions of each add/fetch unit may be performed in two clock cycles. It is also noted that other embodiments implementing pipelines other than the 2- and 4-stage pipelines discussed here.

Tables 9A and 9B shown below illustrate the operations of a two stage pipeline in accordance with Procedures 5 and 6 and the circuit embodiments shown in FIGS. 8 and 9. It should be noted that the values of K in the first pipeline stage are used for the initialization procedure, and will have a value of zero during the encryption procedure.

TABLE 9A

| | iteration 1 | iteration 2 | iteration 3 |
|---|---|---|---|
| pipeline stage 1 | have $j_0$<br>$A_1 = S_0$<br>$j_1 = j_0 + A_1 + K_0 - 1$<br>$B_1 = S[j_1]$<br>for k = 1 through 255<br>$R_k =$<br>B if k = 255<br>A if k = $j_1 - 1$<br>$S_{k+1}$ otherwise | have $j_1$<br>$A_2 = S_0$<br>$j_2 = j_1 + A_2 + K_1 - 1$<br>$B_2 = S[j_2]$<br>for k = 1 through 255<br>$R_k =$<br>B if k = 255<br>A if k = $j_2 - 1$<br>$S_{k+1}$ otherwise | have $j_2$<br>$A_3 = S_0$<br>$j_3 = j_2 + A_3 + K_2 - 1$<br>$B_3 = S[j_3]$<br>for k = 1 through 255<br>$R_k =$<br>B if k = 255<br>A if k = $j_3 - 1$<br>$S_{k+1}$ otherwise |
| pipeline stage 2 | $i_1 = i_0 + 1$<br>$g_1 = A_1 +$<br>$B_1 - i_1$<br>$V_1 = S[g_1]$<br>$result_1 = V_1$ XOR the next byte for encryption | $i_2 = i_1 + 1$<br>$g_2 = A_2 +$<br>$B_2 - i_2$<br>$V_2 = S[g_2]$<br>$result_2 = V_2$ XOR the next byte for encryption | |

TABLE 9B

| | iteration 4 | iteration 5 | iteration 6 |
|---|---|---|---|
| pipeline stage 1 | have $j_3$<br>$A_4 = S_0$<br>$j_4 = j_3 +$<br>$A_4 + K_3 - 1$<br>$B_4 = S[j_4]$<br>for k = 1 through 255<br>$R_k =$<br>B if k = 255<br>A if k = $j_4 - 1$<br>$S_{k+1}$ otherwise | have $j_4$<br>$A_5 = S_0$<br>$j_5 = j_4 +$<br>$A_5 + K_4 - 1$<br>$B_5 = S[j_5]$<br>for k = 1 through 255<br>$R_k =$<br>B if k = 255<br>A if k = $j_5 - 1$<br>$S_{k+1}$ otherwise | have $j_5$<br>$A_6 = S_0$<br>$j_6 = j_5 +$<br>$A_6 + K_5 - 1$<br>$B_6 = S[j_6]$<br>for k = 1 through 255<br>$R_k =$<br>B if k = 255<br>A if k = $j_6 - 1$<br>$S_{k+1}$ otherwise |
| pipeline stage 2 | $i_3 = i_2 + 1$<br>$g_3 = A_3 +$<br>$B_3 - i_3$<br>$V_3 = S[g_3]$<br>$result_3 = V_3$ XOR the next byte for encryption | $i_4 = i_3 + 1$<br>$g_4 = A_4 +$<br>$B_4 - i_4$<br>$V_4 = S[g_4]$<br>$result_4 = V_4$ XOR the next byte for encryption | $i_5 = i_4 + 1$<br>$g_5 = A_5 +$<br>$B_5 - i_5$<br>$V_5 = S[g_5]$<br>$result_5 = V_5$ XOR the next byte for encryption |

Since the embodiments associated with the example illustrated in Tables 9A and 9B are 2-stage pipelines, a byte of data may (assuming a data byte is sent for encryption each clock cycle) be encrypted on each clock cycle starting with the second iteration (i.e. when the pipeline is full). Table 10 below illustrates both an initialization and encryption of the pipelined embodiment of Tables 9A and 9B.

TABLE 10

| | 1st pipeline | | | | | | | | | | | 2nd pipeline | | | | | | | | | | | | |
| --- | --- | --- | --- | --- | --- | --- | --- | --- | --- | --- | --- | --- | --- | --- | --- | --- | --- | --- | --- | --- | --- | --- | --- | --- |
| | S array | | | | | | | | | | | R values | | | | | | | | | | | | |
| key | 0 | 1 | 2 | 3 | 4 | 5 | 6 | 7 | A | j | B | 0 | 1 | 2 | 3 | 4 | 5 | 6 | 7 | A | B | i | g | V |
| initialize | | | | | | | | | | 1 | | 0 | 1 | 2 | 3 | 4 | 5 | 6 | 7 | | | | | |
| 1 | 0 | 1 | 2 | 3 | 4 | 5 | 6 | 7 | 0 | 1 | 1 | 0 | 2 | 3 | 4 | 5 | 6 | 7 | 1 | | | | | |
| 2 | 0 | 2 | 3 | 4 | 5 | 6 | 7 | 1 | 0 | 2 | 3 | 2 | 0 | 4 | 5 | 6 | 7 | 1 | 3 | | | | | |
| 4 | 2 | 0 | 4 | 5 | 6 | 7 | 1 | 3 | 2 | 7 | 3 | 0 | 4 | 5 | 6 | 7 | 1 | 2 | 3 | | | | | |
| 2 | 0 | 4 | 5 | 6 | 7 | 1 | 2 | 3 | 0 | 0 | 0 | 4 | 5 | 6 | 7 | 1 | 2 | 3 | 0 | | | | | |
| 7 | 4 | 5 | 6 | 7 | 1 | 2 | 3 | 0 | 4 | 2 | 6 | 5 | 4 | 7 | 1 | 2 | 3 | 0 | 6 | | | | | |
| 6 | 5 | 4 | 7 | 1 | 2 | 3 | 0 | 6 | 5 | 4 | 2 | 4 | 7 | 1 | 5 | 3 | 0 | 6 | 2 | | | | | |
| 3 | 4 | 7 | 1 | 5 | 3 | 0 | 6 | 2 | 4 | 2 | 1 | 7 | 4 | 5 | 3 | 0 | 6 | 2 | 1 | | | | | |
| 5 | 7 | 4 | 5 | 3 | 0 | 6 | 2 | 1 | 7 | 5 | 6 | 4 | 5 | 3 | 0 | 7 | 2 | 1 | 6 | | | | | |
| end initialize | 4 | 5 | 3 | 0 | 7 | 2 | 1 | 6 | | 0 | | 5 | 3 | 0 | 7 | 2 | 1 | 6 | 4 | | | 0 | | |
| extra clock | 5 | 3 | 0 | 7 | 2 | 1 | 6 | 4 | 5 | 4 | 2 | 3 | 0 | 7 | 5 | 1 | 6 | 4 | 2 | | | 1 | | |
| | 3 | 0 | 7 | 5 | 1 | 6 | 4 | 2 | 3 | 6 | 4 | 4 | 0 | 7 | 5 | 1 | 6 | 3 | 2 | 5 | 2 | 2 | 5 | 6 |
| | 0 | 7 | 5 | 1 | 6 | 3 | 2 | 4 | 0 | 5 | 3 | 7 | 5 | 1 | 6 | 0 | 2 | 4 | 3 | 3 | 4 | 3 | 4 | 6 |
| | 7 | 5 | 1 | 6 | 0 | 2 | 4 | 3 | 7 | 3 | 6 | 5 | 1 | 7 | 0 | 2 | 4 | 3 | 6 | 0 | 3 | 4 | 7 | 3 |
| | 5 | 1 | 7 | 0 | 2 | 4 | 3 | 6 | 5 | 7 | 6 | 1 | 7 | 0 | 2 | 4 | 3 | 5 | 6 | 7 | 6 | 5 | 0 | 5 |
| | 1 | 7 | 0 | 2 | 4 | 3 | 5 | 6 | 1 | 7 | 6 | 7 | 0 | 2 | 4 | 3 | 5 | 1 | 6 | 5 | 6 | 6 | 5 | 3 |
| | 7 | 0 | 2 | 4 | 3 | 5 | 1 | 6 | 7 | 5 | 5 | 0 | 2 | 4 | 3 | 7 | 1 | 6 | 5 | 1 | 6 | 7 | 0 | 7 |
| | 0 | 2 | 4 | 3 | 7 | 1 | 6 | 5 | 0 | 4 | 7 | 2 | 4 | 3 | 0 | 1 | 6 | 5 | 7 | 7 | 5 | 0 | 4 | 7 |
| | 2 | 4 | 3 | 0 | 1 | 6 | 5 | 7 | 2 | 5 | 6 | 4 | 3 | 0 | 1 | 2 | 5 | 7 | 6 | 0 | 7 | 1 | 6 | 5 |
| | 4 | 3 | 0 | 1 | 2 | 5 | 7 | 6 | 4 | 0 | 4 | 3 | 0 | 1 | 2 | 5 | 7 | 6 | 4 | 2 | 6 | 2 | 6 | 7 |
| | 3 | 0 | 1 | 2 | 5 | 7 | 6 | 4 | 3 | 2 | 1 | 0 | 3 | 2 | 5 | 7 | 6 | 4 | 1 | 4 | 4 | 3 | 5 | 7 |
| | 0 | 3 | 2 | 5 | 7 | 6 | 4 | 1 | 0 | 1 | 3 | 0 | 2 | 5 | 7 | 6 | 4 | 1 | 3 | 3 | 1 | 4 | 0 | 0 |
| | 0 | 2 | 5 | 7 | 6 | 4 | 1 | 3 | 0 | 0 | 0 | 2 | 5 | 7 | 6 | 4 | 1 | 3 | 0 | 0 | 3 | 5 | 6 | 1 |

It should be noted that the example shown in Table 10 is based upon an 8-element array as are the previous examples illustrating various procedures disclosed within. Also note than an extra clock cycle is present in order to fill the pipeline. Therefore, index value i is initially set to zero and incremented to one during the extra clock cycle.

FIG. 10 is a schematic diagram of an exemplary embodiment of a circuit that may be used for pipelining an encryption algorithm. In particular, the circuit 1050 illustrated in FIG. 10 is configured for a 4-stage pipeline and an 8-element array (for the purposes of clarity), and illustrates one possible way a circuit may be implemented for performing the initialization and encryption procedures.

Tables 11A and 11B shown below illustrate the operation of a 4-stage pipeline. This illustration combines Procedure 5 with Procedure 7 and Procedure 6 with Procedure 8. For initialization, the first pipeline stage uses Procedure 7 through step 7.3.2. On the clock edge at the end of the first pipeline stage the array is shifted as in step 7.3.3. Since the shifting of the pipeline occurs on the clock edge, it may be thought of as happening "between" the pipeline stages. Step 7.3.4 is the same as step 5.3.3 and is performed in the second pipeline stage. Steps 5.3.4, 5.3.5 and 5.3.6 are accomplished on the next clock edge.

For encryption or decryption, the first pipeline stage uses Procedure 8 up through step 8.2. On the clock edge at the end of the first pipeline stage, the array is shifted as in step 8.3. Step 8.4 is the same as step 6.3 and is performed in the second pipeline stage. Steps 6.4, 6.5, and 6.6 are accomplished on the next clock edge. Steps 6.7 and 6.8 are performed in the third pipeline stage. Step 6.9 involves a cascade of multiplexers as shown in FIG. 1 and may be in the third pipeline stage, the fourth pipeline stage, or split with the early part of the cascade in the third pipeline stage and the later part in the fourth pipeline stage. If some or all of step 6.9 is executed in the fourth pipeline stage, then step 6.10 is also executed in the fourth pipeline stage (or in some embodiments, a $5^{th}$ pipeline stage). Finally, if step 6.9 is entirely in the third pipeline stage, then step 6.10 may be executed in either the third pipeline stage or the fourth pipeline stage. If step 6.10 is executed in the third pipeline stage, then there is no fourth pipeline stage but the encryption result is available late in the third clock cycle. If it is executed in a fourth pipeline stage, the encryption result is available early in the fourth clock cycle. Tables 11A and 11B show the case where the cascade of multiplexer to obtain V[g], step 6.9, are in the third pipeline stage and the XORing of the value of V[g] with the data to be encrypted, step 6. 10, is in the fourth pipeline stage.

TABLE 11A

| | iteration 1 | iteration 2 | iteration 3 |
| --- | --- | --- | --- |
| pipeline stage 1 | have $j_0$<br>$A_1 = S_1$<br>$j_1 = j_0 +$<br>$A_1 + K_0 - 1$ | have $j_1$<br>if $j_1 = 1$<br>then $A_2 = A_1$<br>else $A_2 = S_1$<br>$j_2 = j_1 +$<br>$A_2 + K_1 - 1$ | have $j_2$<br>if $j_2 = 1$<br>then $A_3 = A_2$<br>else $A_3 = S_1$<br>$j_3 = j_2 +$<br>$A_3 + K_2 - 1$ |
| pipeline stage 2 | | $B_1 = S[j_1]$<br>for k = 1<br>through 255<br>$R_k =$<br>$B_1$ if k = 255<br>$A_1$ if k =<br>$j_1 - 1$<br>$S_{k+1}$ otherwise | $B_2 = S[j_2]$<br>for k = 1<br>through 255<br>$R_k =$<br>$B_2$ if k = 255<br>$A_2$ if k = $j_2 - 1$<br>$S_{k+1}$ otherwise |
| pipeline stage 3 | | | $i_1 = i_0 + 1$<br>$g_1 = A_1 +$<br>$B_1 - i_0$ |
| pipeline stage 4 | | | |

TABLE 11B

| | iteration 4 | iteration 5 | iteration 6 |
|---|---|---|---|
| pipeline stage 1 | have $j_3$<br>if $j_3 = 1$<br>then $A_4 = A_3$ | have $j_4$ if $j_4 = 1$<br>then $A_5 = A_4$<br>else $A_5 = S_1$ | have $j_5$<br>if $j_5 = 1$<br>then $A_6 = A_5$ | iteration). If each pipeline stage is configured to perform its respective operations within one clock cycle, then one encryption for each clock cycle may occur.

Table 12 below further illustrates the operation of a 4-stage pipeline. It is noted that in the example shown that index value i is initially set to –1 and three extra clock cycles are added in order to fill the pipeline. Thus, encryption begins on the first clock cycle following extra clock #3.

TABLE 12

| | 1st pipeline | | | | | | | | | | | | | 2nd pipeline | | | | | | | | | pipelines | | | | |
|---|---|---|---|---|---|---|---|---|---|---|---|---|---|---|---|---|---|---|---|---|---|---|---|---|---|---|---|
| | S array | | | | | | | | | | | | | R values | | | | | | | | | 3rd | | | 4th | |
| key | 0 | 1 | 2 | 3 | 4 | 5 | 6 | 7 | X | A | j | A | j | B | 0 | 1 | 2 | 3 | 4 | 5 | 6 | 7 | A | B | i | g | g | V |
| initialize | | | | | | | | | | 0 | 1 | | | | 0 | 1 | 2 | 3 | 4 | 5 | 6 | 7 | | | | | | |
| 1 | 0 | 1 | 2 | 3 | 4 | 5 | 6 | 7 | 1 | 0 | 2 | 0 | 1 | 1 | 0 | 2 | 3 | 4 | 5 | 6 | 7 | 1 | | | | | | |
| 2 | 0 | 2 | 3 | 4 | 5 | 6 | 7 | 1 | 2 | 2 | 7 | 0 | 2 | 3 | 2 | 0 | 4 | 5 | 6 | 7 | 1 | 3 | | | | | | |
| 4 | 2 | 0 | 4 | 5 | 6 | 7 | 1 | 3 | 0 | 0 | 0 | 2 | 7 | 3 | 0 | 4 | 5 | 6 | 7 | 1 | 2 | 3 | | | | | | |
| 2 | 0 | 4 | 5 | 6 | 7 | 1 | 2 | 3 | 4 | 4 | 2 | 0 | 0 | 0 | 4 | 5 | 6 | 7 | 1 | 2 | 3 | 0 | | | | | | |
| 7 | 4 | 5 | 6 | 7 | 1 | 2 | 3 | 0 | 5 | 5 | 4 | 4 | 2 | 6 | 5 | 4 | 7 | 1 | 2 | 3 | 0 | 6 | | | | | | |
| 6 | 5 | 4 | 7 | 1 | 2 | 3 | 0 | 6 | 4 | 4 | 2 | 5 | 4 | 2 | 4 | 7 | 1 | 5 | 3 | 0 | 6 | 2 | | | | | | |
| 3 | 4 | 7 | 1 | 5 | 3 | 0 | 6 | 2 | 7 | 7 | 5 | 4 | 2 | 1 | 7 | 4 | 5 | 3 | 0 | 6 | 2 | 1 | | | | | | |
| 5 | 7 | 4 | 5 | 3 | 0 | 6 | 2 | 1 | set j = 0 | | | 7 | 5 | 6 | 4 | 5 | 3 | 0 | 7 | 2 | 1 | 6 | | | set i = –1 | | | |
| extra clock #1 | 4 | 5 | 3 | 0 | 7 | 2 | 1 | 6 | | 5 | 4 | | | 0 | 5 | 3 | 0 | 7 | 2 | 1 | 6 | 4 | | 0 | | | | |
| extra clock #2 | 5 | 3 | 0 | 7 | 2 | 1 | 6 | 4 | 3 | 3 | 6 | 5 | 4 | 2 | 3 | 0 | 7 | 5 | 1 | 6 | 4 | 2 | | 1 | | | | |
| extra clock #3 | 3 | 0 | 7 | 5 | 1 | 6 | 4 | 2 | 0 | 0 | 5 | 3 | 6 | 4 | 4 | 0 | 7 | 5 | 1 | 6 | 3 | 2 | 5 | 2 | 2 | 4 | | |
| | 0 | 7 | 5 | 1 | 6 | 3 | 2 | 4 | 7 | 7 | 3 | 0 | 5 | 3 | 7 | 5 | 1 | 6 | 0 | 2 | 4 | 3 | 3 | 4 | 3 | 3 | 4 | 6 |
| | 7 | 5 | 1 | 6 | 0 | 2 | 4 | 3 | 5 | 5 | 7 | 7 | 3 | 6 | 5 | 1 | 7 | 0 | 2 | 4 | 3 | 6 | 0 | 3 | 5 | 6 | 3 | 6 |
| | 5 | 1 | 7 | 0 | 2 | 4 | 3 | 6 | 1 | 1 | 7 | 5 | 7 | 6 | 1 | 7 | 0 | 2 | 4 | 3 | 5 | 6 | 7 | 6 | 6 | 7 | 6 | 3 |
| | 1 | 7 | 0 | 2 | 4 | 3 | 5 | 6 | 7 | 7 | 5 | 1 | 7 | 6 | 7 | 0 | 2 | 4 | 3 | 5 | 1 | 6 | 5 | 6 | 7 | 4 | 7 | 5 |
| | 7 | 0 | 2 | 4 | 3 | 5 | 1 | 6 | 0 | 0 | 4 | 7 | 5 | 5 | 0 | 2 | 4 | 3 | 7 | 1 | 6 | 5 | 1 | 6 | 0 | 7 | 4 | 3 |
| | 0 | 2 | 4 | 3 | 7 | 1 | 6 | 5 | 2 | 2 | 5 | 0 | 4 | 7 | 2 | 4 | 3 | 0 | 1 | 6 | 5 | 7 | 7 | 5 | 1 | 3 | 7 | 7 |
| | 2 | 4 | 3 | 0 | 1 | 6 | 5 | 7 | 4 | 4 | 0 | 2 | 5 | 6 | 4 | 3 | 0 | 1 | 2 | 5 | 7 | 6 | 0 | 7 | 2 | 5 | 3 | 7 |
| | 4 | 3 | 0 | 1 | 2 | 5 | 7 | 6 | 3 | 3 | 2 | 4 | 0 | 4 | 3 | 0 | 1 | 2 | 5 | 7 | 6 | 4 | 2 | 6 | 3 | 5 | 5 | 5 |
| | 3 | 0 | 1 | 2 | 5 | 7 | 6 | 4 | 0 | 0 | 1 | 3 | 2 | 1 | 0 | 3 | 2 | 5 | 7 | 6 | 4 | 1 | 4 | 4 | 4 | 4 | 5 | 7 |
| | 0 | 3 | 2 | 5 | 7 | 6 | 4 | 1 | 3 | 0 | 0 | 0 | 1 | 3 | 0 | 2 | 5 | 7 | 6 | 4 | 1 | 3 | 3 | 1 | 5 | 7 | 4 | 7 |
| | 0 | 2 | 5 | 7 | 6 | 4 | 1 | 3 | 2 | 2 | 1 | 0 | 0 | 0 | 2 | 5 | 7 | 6 | 4 | 1 | 3 | 0 | 0 | 3 | 6 | 5 | 7 | 0 |

TABLE 11B-continued

| | iteration 4 | iteration 5 | iteration 6 |
|---|---|---|---|
| | else $A_4 = S_1$<br>$j_4 = j_3 + A_4 + K_3 - 1$ | $j_5 = j_4 +$<br>$A_5 + K_4 - 1$ | else $A_6 = S_1$<br>$j_6 = j_5 +$<br>$A_6 + K_5 - 1$ |
| pipeline stage 2 | $B_3 = S[j_3]$<br>for k = 1<br>through 255<br>$R_k =$<br>$B_3$ if k = 255<br>$A_3$ if k =<br>$j_3 - 1$<br>$S_{k+1}$ otherwise | $B_4 = S[j_4]$<br>for k = 1<br>through 255<br>$R_k = B_4$<br>if k = 255<br>$A_5$ if k =<br>$j_5 - 1$<br>$S_{k+1}$ otherwise | $B_5 = S[j_5]$<br>for k = 1<br>through 255<br>Rk =<br>$B_5$ if k = 255<br>$A_5$ if k =<br>$j_5 - 1$<br>$S_{k+1}$ otherwise |
| pipeline stage 3 | $i_2 = i_1 + 1$<br>$g_2 = A_2 +$<br>$B_2 - i_1$ | $i_3 = i_2 + 1$<br>$g_3 = A_3 +$<br>$B_3 - i_2$ | $i4 = i_3 + 1$<br>$g_4 = A_4 +$<br>$B_4 - i_3$ |
| pipeline stage 4 | $V_1 =$<br>$A_2$ if $g_1 = 255$<br>$B_2$ if $g_1 +$<br>$1 = j_2$<br>$S[g_1]$ otherwise<br>$result_1 = V_1$ XOR<br>the next byte<br>for encryption | $V_2 =$<br>$A_3$ if $g_2 = 255$<br>$B_3$ if $g_2 +$<br>$1 = j_3$<br>$S[g_2]$ otherwise<br>$result_2 = V_2$ XOR<br>the next byte<br>for encryption | $V_3 =$<br>$A_4$ if $g_3 = 255$<br>$B_4$ if $g_3 +$<br>$1 = j_4$<br>$S[g_3]$ otherwise<br>$result_3 = V_3$ XOR<br>the next byte<br>for encryption |

As shown above, Tables 11A and 11B illustrate how operations may be separated in order to form a 4-stage pipeline. Since the pipeline has 4 stages, an actual encryption does not take place until the fourth iteration. However, an encryption may be performed with each iteration beginning with the fourth (providing that data is provided for each iteration). If each pipeline stage is configured to perform its respective operations within one clock cycle, then one encryption for each clock cycle may occur.

Pipelining without Shifted Arrays

The examples above are directed to pipelining when a procedure involving array shifting is used for the initialization and encryption. The array shifting is performed in order to allow a data value (typically A) to be read from the same location of the array for each iteration. However, using the storage elements of a register file or other memory device, pipelining of the encryption and initialization procedures can be accomplished without performing the array shifting.

Figure 11A:
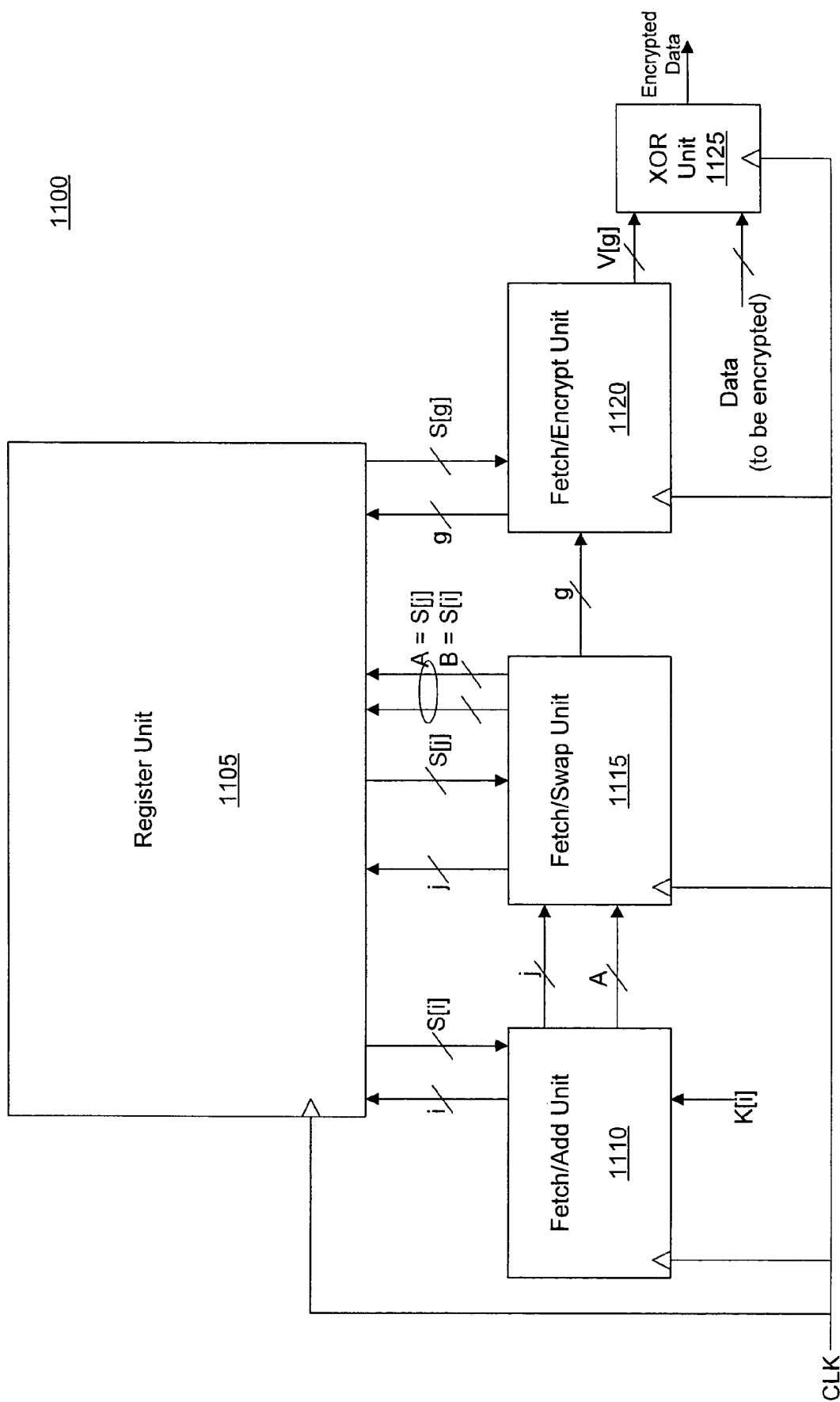
FIG. 11A is a block diagram of another embodiment of a pipelining circuit for an encryption algorithm.

FIG. 11A is a block diagram of another embodiment of a pipelining circuit for an encryption algorithm. Encryption circuit 1100, instead of using the array element circuits of the embodiment shown in FIG. 9, stores array values in a register unit 1105 having one or more register files. Register unit 1105 may store the entire array. Each register address within register unit 1105 may be associated with one array position. Register unit 1105 may also be configured for multiple simultaneous reads. In one embodiment, the register files of register unit 1105 include 3 read ports, and thus the contents of 3 different array addresses may be read at any given time. The register files of register unit 1105 may also include multiple write ports. In the embodiment shown, each register file of register unit 1105 includes two write ports, allowing the simultaneous writing of two locations. Thus, the register files can simultaneously support three read operations and two write operation, thereby allowing operations to be conducted in parallel for a pipelined implementation. Using a register file with three read ports and two write ports, a 3- or 4-stage pipeline may be implemented.

Figure 11B:
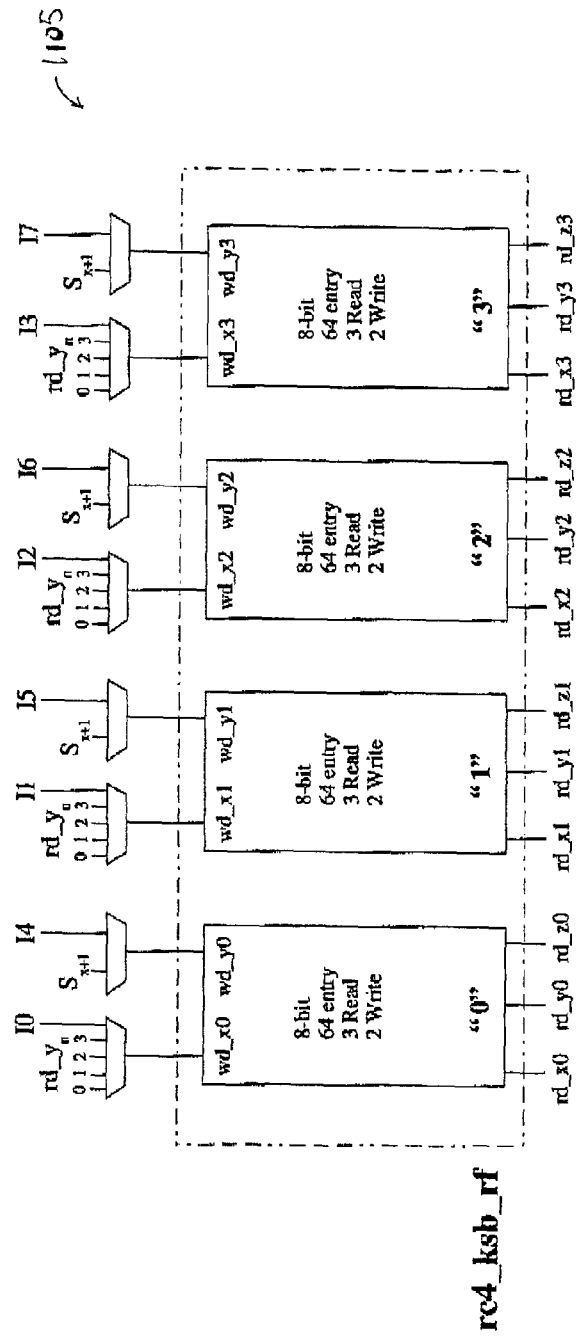
FIG. 11B is a block diagram of one embodiment of a register file that may be used with the embodiment discussed in FIG. 10A.

FIG. 11B shows one example of a register unit 1105. In the embodiment shown, register unit 1105 includes four register files each having 64 entries (for 256 entries total). Thus, register unit 1105 may store an array having 256 elements with each array element corresponding to an entry in a register file. Also shown in FIG. 10B are the three read ports and two write ports previously discussed.

Returning to FIG. 11A, fetch/add unit 1110 performs the functions for a first pipeline stage. Fetch/add unit may clock cycle. It is also noted that, as in the other pipelined embodiments discussed herein, operations in each pipeline stage are simultaneous with respect to each other. For example, in the third clock cycle, the value of $V_1$ being XORed with a data byte occurs simultaneously with the operations of stage 2 of the pipeline (reading $B_2$, performing the swap operation, and calculating $g_2$), which in turn are simultaneous to operations occurring in stage 1 of the pipeline (reading $A_3$, calculating $j_3$).

TABLE 13

|  | Iteration 1 | Iteration 2 | Iteration 3 | Iteration 4 | Iteration 5 | Iteration 6 |
| --- | --- | --- | --- | --- | --- | --- |
| Stage 1 | $A_1 = S[i_1]$ | $A_2 = S[i_2]$ | $A_3 = S[i_3]$ | $A_4 = S[i_4]$ | $A_5 = S[i_5]$ | $A_6 = S[i_6]$ |
|  | $j_1 = j_0 + A_1$ | $j_2 = j_1 + A_2$ | $j_3 = j_2 + A_3$ | $j_4 = j_3 + A_4$ | $j_5 = j_4 + A_5$ | $j_6 = j_5 + A_6$ |
| Stage 2 |  | $B_1 = S[j_1]$ | $B_2 = S[j_2]$ | $B_3 = S[j_3]$ | $B_4 = S[j_4]$ | $B_5 = S[j_5]$ |
|  |  | $S[i_1] = B_1$ | $S[i_2] = B_2$ | $S[i_3] = B_3$ | $S[i_4] = B_4$ | $S[i_5] = B_5$ |
|  |  | $S[j_1] = A_1$ | $S[j_2] = A_2$ | $S[j_3] = A_3$ | $S[j_4] = A_4$ | $S[j_5] = A_5$ |
|  |  | $g_1 = A_1 + B_1$ | $g_2 = A_2 + B_2$ | $g_3 = A_3 + B_3$ | $g_4 = A_4 + B_4$ | $g_5 = A_5 + B_5$ |
| Stage 3 |  |  | $V_1 = S[g_1]$ | $V_2 = S[g_2]$ | $V_3 = S[g_3]$ | $V_4 = S[g_4]$ |
|  |  |  | $V_1$ XOR byte | $V_2$ XOR byte | $V_3$ XOR byte | $V_4$ XOR byte | provide the index i as an address to register unit 1105. Responding to the address input, register unit 1105 may return the value of A to fetch/add unit 1110 from the S[i] position of the array. Fetch/add unit 1110 also includes arithmetic circuitry for calculating the index value j.

Fetch/swap unit 1115 may receive the calculated index value j and the value A from fetch/add unit 1110. The received index value j is then provided to register unit 1105 in order to obtain the value B from the S[j] position of the array. Fetch/swap unit 1115 also performs the swap operation by forwarding the value A to an address indicated by index value j (S[j]) and value B to an address indicated by index value i (S[i]) in register unit 1105. The index value g is also calculated by fetch/swap unit 1115.

Fetch/encrypt unit 1120 is coupled to receive the index value g from fetch swap unit 1115. The index value g is provided by fetch/encrypt unit 1120 to register unit 1105, which returns value V from the S[g] position of the array. The value V retrieved from the array is then provided to XOR unit 1125, where it is XORed with a block of data (e.g. one byte) to be encrypted. XOR unit 1125 may occur in either the third clock cycle for a three-clock pipeline implementation of a fourth clock cycle for a four-clock pipeline implementation. In a three-clock pipeline implementation, the encryption result is available near the end of the third clock cycle, wherein in a four clock-pipeline, the encryption result is available early in the fourth clock cycle. The time of arrival within the clock cycle of the data byte (being encrypted) may be an important factor in deciding whether to implement a three-clock or a four-clock pipeline.

As with the previously described pipeline embodiments (FIGS. 9, 10, tables 9-12), the operation of each pipeline stage occurs simultaneously with respect to the operations of the other pipeline stages. Thus, in this embodiment, the reading of values A, B, and V each occur simultaneously once the pipeline is full.

Table 13 below illustrates the operation for one embodiment of encryption using a 3-stage pipeline. In the embodiment shown, it is assumed that the operations of each pipeline stage occur in a single clock cycle. Thus, beginning with the third clock cycle, when the pipeline is full, an encryption of a data byte may occur with each successive Although the various embodiments of the method and apparatus described above with respect to the encryption of information, it should be noted that these same embodiments may also be used for the decryption of information. Furthermore, while the various method embodiments have been described herein as being performed using hardware, these same methods may be implemented using software as well.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method of encrypting information, the method comprising:
    in a first pipeline stage:
        obtaining a value A from an array having a plurality of values, wherein each of the values is stored in a corresponding one of a plurality of storage locations; and
        determining a value B based on the value A; and
    in a second pipeline stage:
        obtaining a value V from a position in the array that is based on the value A and the value B;
        exclusive ORing the value V with a data value that forms a portion of the information;
    wherein the method further comprises:
        shifting the array to enable the value A to be obtained from the same one of the plurality of storage locations in the array for each iteration; and
        obtaining the value A from the same one of the plurality of storage locations for each iteration.

2. The method as recited in claim 1, wherein the array is initialized using an encryption key sequence.

3. The method as recited in claim 1, wherein a first iteration of said obtaining and said exclusive ORing in the second pipeline stage is performed simultaneously with a second iteration of said obtaining and said determining in the first pipeline stage.

4. The method as recited in claim 3, wherein the first iteration is based on a first value A in said array and wherein the second iteration is based on a next value A in said array.

5. The method as recited in claim 3 further comprising incrementing an index value i during each iteration.

6. The method as recited in claim 5 further comprising resetting the index value i to zero responsive to reaching a pre-determined limit.

7. The method as recited in claim 6, wherein the pre-determined limit is 256.

8. The method as recited in claim 6 further comprising incrementing the index value i during each iteration prior to said resetting.

9. The method as recited in claim 1, wherein each of the plurality of values is stored in a storage location comprising flip-flops.

10. The method as recited in claim 9, wherein the first pipeline stage includes a first sub-stage and a second sub-stage, wherein obtaining the value A is performed in the first sub-stage and said determining the value B is determined in the second sub-stage.

11. The method as recited in claim 9, wherein the second pipeline stage includes a third sub-stage and a fourth sub-stage, wherein an index value g based on the value A and the value B and the value V is determined in the third sub-stage, and said exclusive ORing is performed in the fourth sub-stage.

12. The method as recited in claim 9, wherein the second pipeline stage includes a third sub-stage and a fourth sub-stage, wherein an index value g based on the value A and the value B is determined in the third sub-stage and wherein the value V and said exclusive ORing is performed in the fourth sub-stage.

13. The method as recited in claim 1, wherein the array is stored in one or more register files.

14. The method as recited in claim 13, wherein the first pipeline stage includes a first substage and a second sub-stage, wherein said obtaining the value A is performed in the first substage and said determining the value B is performed in the second substage.

15. The method as recited in claim 14 further comprising performing a swap operation in the second sub-stage, wherein the swap operation comprises switching the locations of the value A and the value B.

16. The method as recited in claim 13, wherein the first pipeline stage includes a first sub-stage and a second sub-stage, wherein said obtaining the value A is performed in the first sub-stage and said determining the value B is performed in the second sub-stage.

17. The method as recited in claim 16, wherein the second pipeline stage includes a third substage and a fourth sub-stage, wherein an index value g based on the value A and the value B and a value V based on the value g is determined in the third substage, and wherein said XORing is performed in the fourth substage.

18. The method as recited in claim 1, wherein obtaining the value B comprises determining an index j based on the value A, wherein the value B is the $j^{th}$ element of the array.

19. The method as recited in claim 18, wherein determining a value for the index j comprises calculating the sum of j+A.

20. The method as recited in claim 1, wherein obtaining the value V comprises determining the sum of the value A and the value B and reading the $g^{th}$ element of the array, wherein g is the sum of the value A and the value B.

21. An encryption apparatus comprising:
a plurality of storage locations configured to store an array;
a first logic unit configured to read a value A from the array and determine a value B based on the value A; and
a second logic unit configured to read a value V from a position in the array that is based on the value A and the value B and to exclusive OR the value V with a data value that forms a portion information that is to be encrypted;
wherein the first logic unit comprises a first pipeline stage and the second logic unit comprises a second pipeline stage;
wherein the encryption apparatus is further configured to:
shift the array to within the plurality of storage locations to enable the value A to be read from the same one of the plurality of storage locations for each iteration; and
read the value A from the same one of the plurality of storage locations for each iteration.

22. The encryption apparatus as recited in claim 21 wherein the encryption apparatus is coupled to receive an encryption key sequence to initialize the array.

23. The encryption apparatus as recited in claim 21, wherein the second pipeline stage is configured to read the value V from the position in the array that is based on the value A and the value B and to exclusive OR the value V with a data value simultaneously with the first pipeline stage a second iteration of reading the value A from the array and calculate a value B based on the value A.

24. The encryption apparatus as recited in claim 23, wherein the first iteration is based on a first value A in said array and wherein the second iteration is based on a next value A in said array.

25. The encryption apparatus as recited in claim 23, wherein the encryption apparatus is further configured to increment an index value i during each iteration.

26. The encryption apparatus as recited in claim 25, wherein the encryption apparatus is configured to reset the index value i to zero responsive to the index value reaching a predetermined limit.

27. The encryption apparatus as recited in claim 26, wherein the predetermined limit is 256.

28. The encryption apparatus as recited in claim 26, wherein the encryption device is configured to increment the index value i during each iteration prior to resetting.

29. The encryption apparatus as recited in claim 21, wherein each of the plurality of storage locations includes flip-flops.

30. The encryption apparatus as recited in claim 29, wherein the first pipeline stage includes a first sub-stage and a second sub-stage, wherein obtaining the value A is performed in the first sub-stage and said determining the value B is determined in the second sub-stage.

31. The encryption apparatus as recited in claim 29, wherein the second pipeline stage includes a third sub-stage and a fourth sub-stage, wherein an index value g based on the value A and the value B and a value V based on the value g are determined in the third sub-stage, and wherein said exclusive ORing is performed in the fourth sub-stage.

32. The encryption apparatus as recited in claim 21, wherein each of the plurality of storage locations is a location in a register file.

33. The encryption apparatus as recited in claim 32, wherein the first pipeline stage includes a first substage and a second substage, wherein said obtaining the value A is performed in the first substage and said determining the value B is performed in the second substage.

34. The encryption apparatus as recited in claim 33, wherein the second sub-stage is configured to perform a swap operation, wherein the swap operation comprises switching the locations of the value A and the value B.

35. The encryption apparatus as recited in claim 32, wherein the first pipeline stage includes a first sub-stage and a second sub-stage, wherein the first sub-stage is configured to obtain the value A, and wherein the second sub-stage is configured to determine the value B, and wherein the second pipeline stage includes a third substage and a fourth substage, wherein the third substage is configured to determine the value V and wherein the fourth substage is configure to perform said exclusive ORing.

36. The encryption apparatus as recited in claim 21, wherein the first logic unit is configured to determine an index value j based on the value A, wherein the value B is the $j^{th}$ element of the array.

37. The encryption apparatus as recited in claim 36, wherein the first logic unit is configured to determine the index value j based on the sum of j+A.

38. The encryption apparatus as recited in claim 36, wherein the encryption apparatus is further configured to calculate an index value g, wherein the index value g is the sum of the value A and the value B, and wherein V is the $g^{th}$ element of the array.

* * * * *